(12) United States Patent
Gagne et al.

(10) Patent No.: US 9,048,640 B2
(45) Date of Patent: Jun. 2, 2015

(54) ELECTRICAL BOX AND SLEEVE ASSEMBLY

(71) Applicant: Brainwave Research Corporation, Ontario (CA)

(72) Inventors: Jean-Guy Gagne, Ontario (CA); James W. Rogers, Ontario (CA)

(73) Assignee: Brainwave Research Corporation, Ontario (CA)

( * ) Notice: Subject to any disclaimer, the term of this patent is extended or adjusted under 35 U.S.C. 154(b) by 148 days.

(21) Appl. No.: 13/745,034

(22) Filed: Jan. 18, 2013

(65) Prior Publication Data

US 2013/0180774 A1  Jul. 18, 2013

Related U.S. Application Data

(60) Provisional application No. 61/587,957, filed on Jan. 18, 2012.

(51) Int. Cl.
*H01H 9/02* (2006.01)
*H02G 3/02* (2006.01)
*H02G 3/12* (2006.01)
*F16M 13/02* (2006.01)

(52) U.S. Cl.
CPC . *H02G 3/02* (2013.01); *H02G 3/12* (2013.01); *F16M 13/02* (2013.01)

(58) Field of Classification Search
USPC ........................................ 220/3.5; 174/53, 57
See application file for complete search history.

(56) References Cited

U.S. PATENT DOCUMENTS

| | | | | |
|---|---|---|---|---|
| 6,309,248 | B1 * | 10/2001 | King | 439/535 |
| 6,533,225 | B1 * | 3/2003 | Berges et al. | 248/27.1 |
| 6,715,625 | B2 * | 4/2004 | MacDonald | 220/3.5 |
| 2003/0014939 | A1 * | 1/2003 | DeWall | 52/741.1 |
| 2009/0057303 | A1 * | 3/2009 | Oddsen et al. | 220/3.5 |

* cited by examiner

*Primary Examiner* — Hung V Ngo
(74) *Attorney, Agent, or Firm* — Ditthavong & Steiner, P.C.

(57) ABSTRACT

An assembly includes a box and a removable sleeve that is engageble with the box and with a wall substrate to secure tight contact between the wall substrate and the box structure, irrespective of the thickness of the wall substrate. The sleeve is configured to be coupled to an electrical device having a corresponding configuration for insertion in the box.

29 Claims, 29 Drawing Sheets

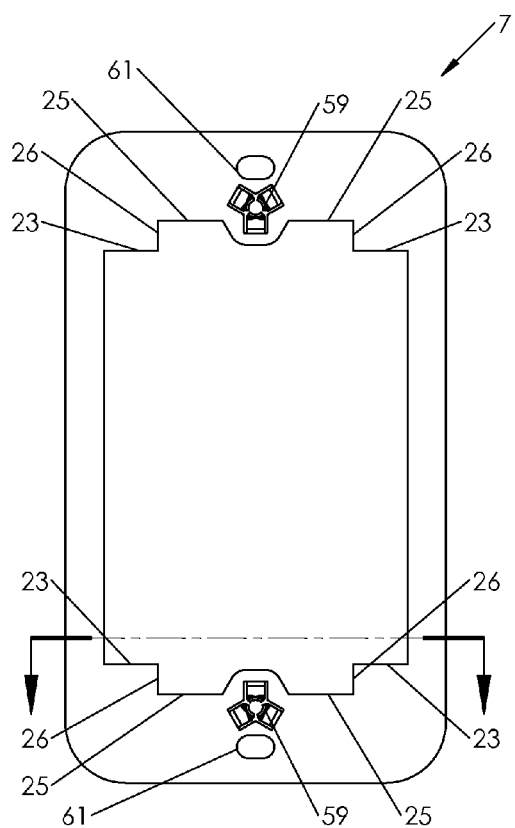
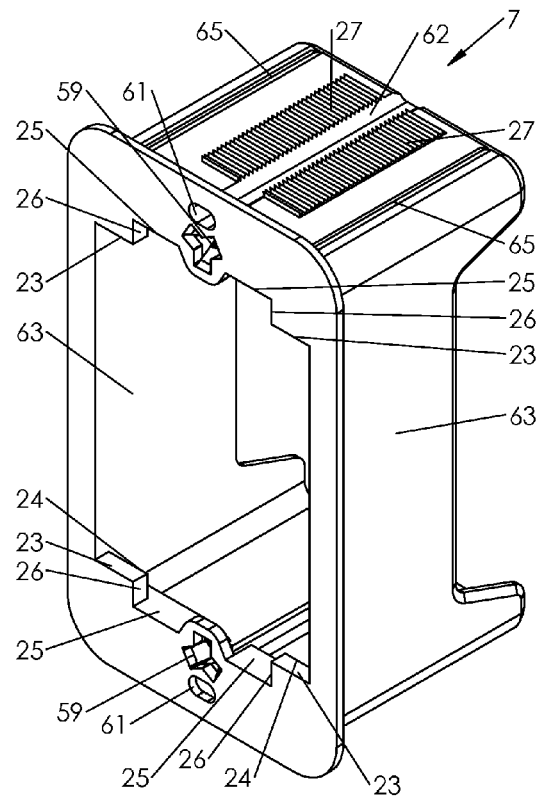
FIG. 9a
FIG. 9b
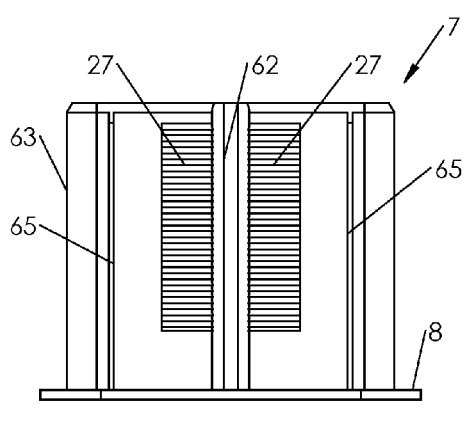
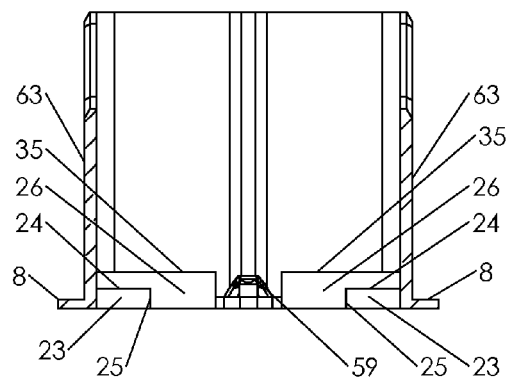
FIG. 9c
FIG. 9d

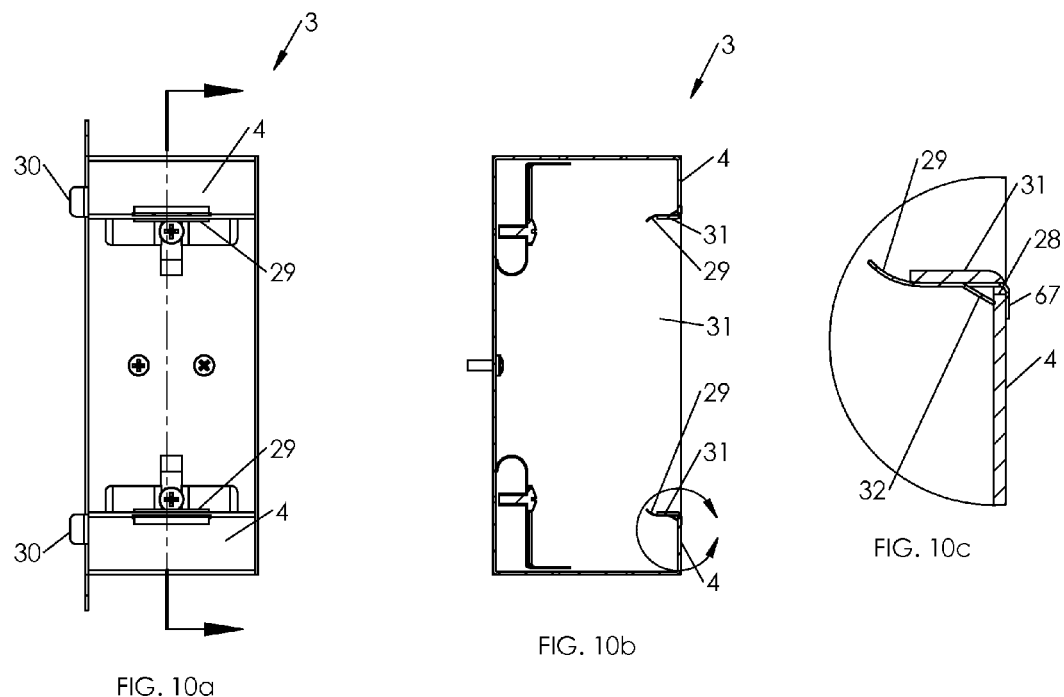
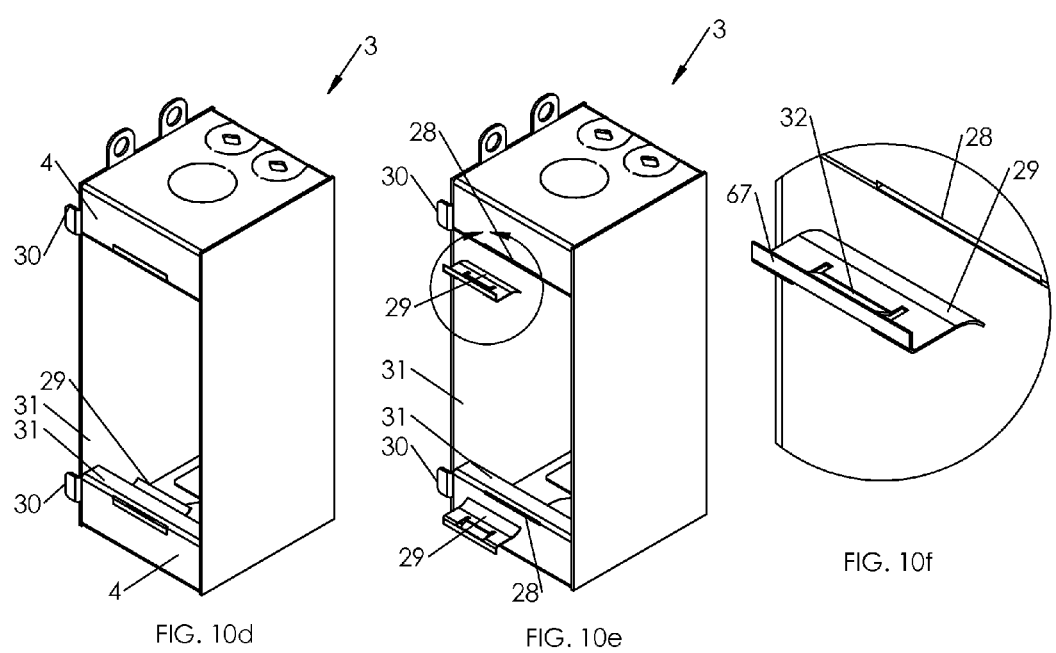

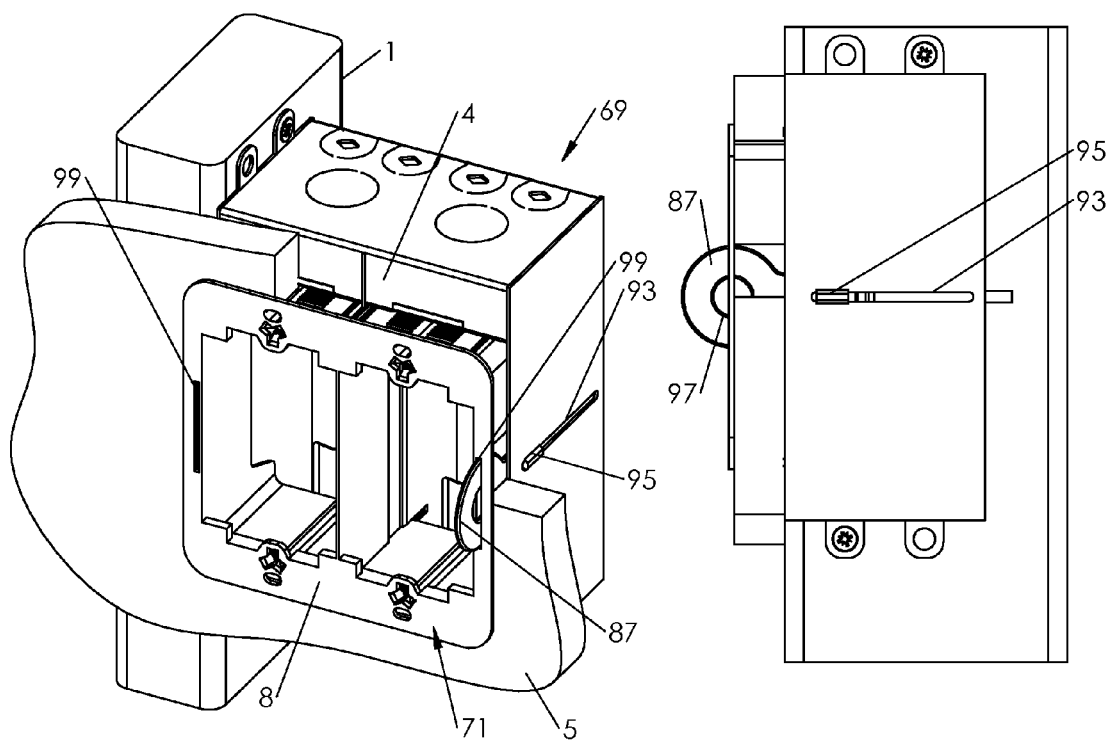
FIG. 12a                    FIG. 12b
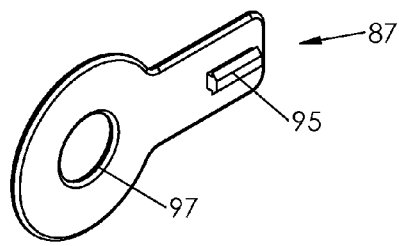
FIG. 12c

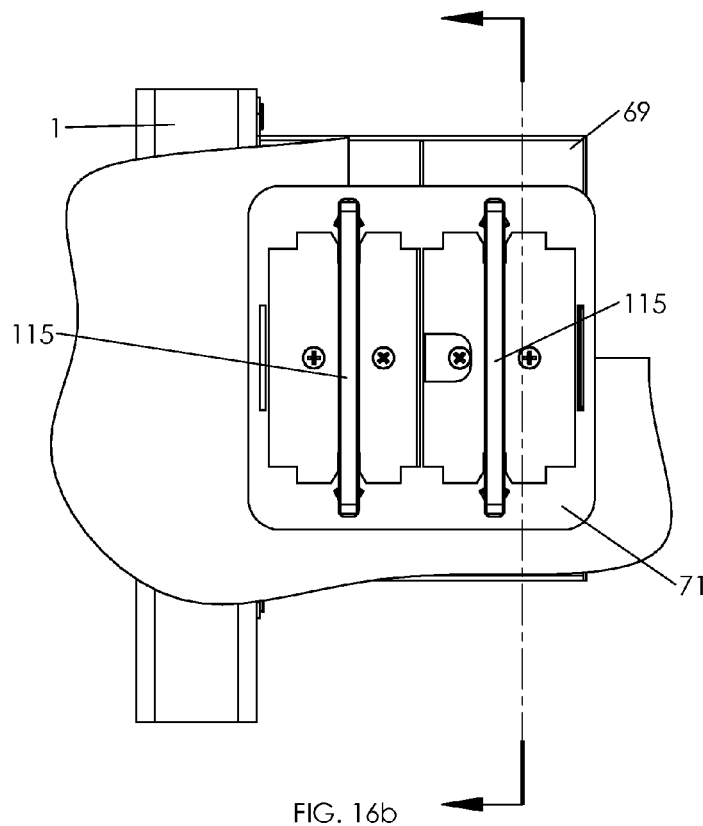
FIG. 16b
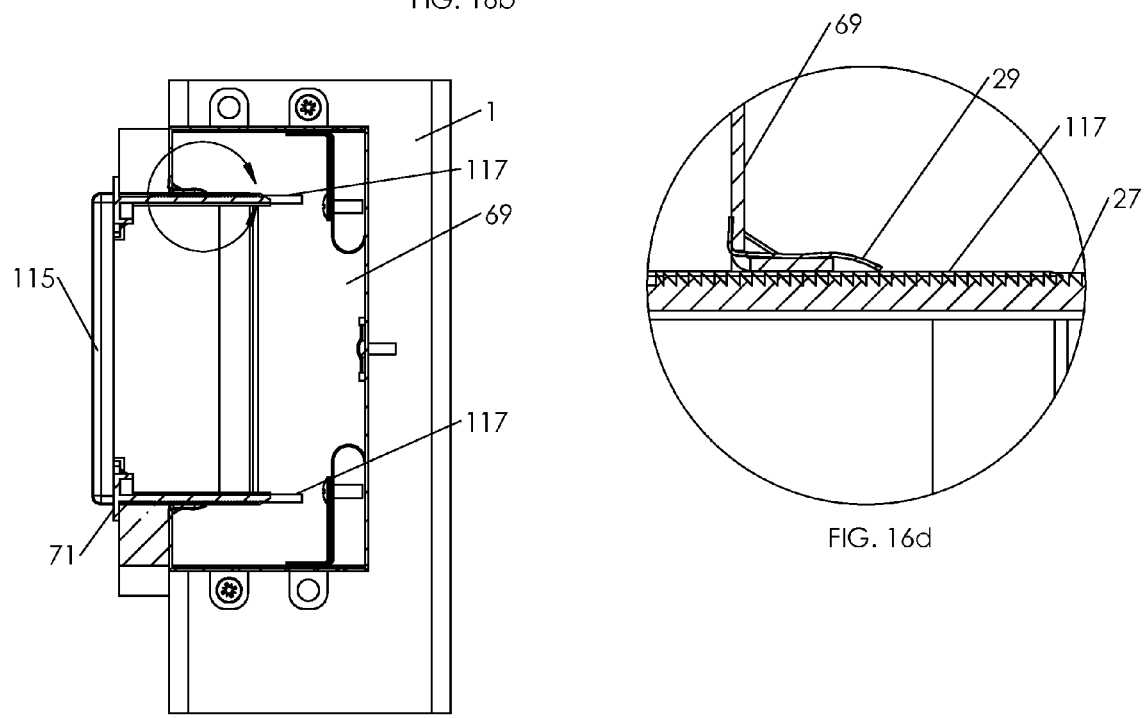
FIG. 16c
FIG. 16d

ELECTRICAL BOX AND SLEEVE ASSEMBLY

The benefit of provisional application 61/587,957, filed Jan. 18, 2012 on behalf of inventors Jean-Guy Gagne and James Rogers, is claimed under 35 U.S.C. 119(e).

BACKGROUND

This disclosure is related to installation of electrical components in building walls, more particularly, to installation of support structure for line voltage and low voltage devices and the like. Existing electrical codes require containment of electrical switches and receptacles within electrical boxes. In new house or building construction, line current electrical boxes typically are attached to wall studs or joists before drywall or equivalent sheet material is applied to enclose the wall space. An opening is cut in the sheet material to accommodate the box or boxes that have been mounted in known positions. According to code, the enclosure of a line voltage electrical device must be in continuity with the wall substrate. Although low voltage applications, such as network communications, need not meet line voltage box requirements, means must be provided in the wall to provide appropriate access to internal wiring.

As the wall substrate, such as drywall, is fixed to the wall stud structure before installation of an electrical device can be completed, needs exist for efficiently locating and creating an opening in the substrate and for engaging the device in its enclosure. Cutting an opening in the wall substrate that is appropriately sized and placed can be time consuming. Difficulties exist in accurately locating a template to meet this need.

Conventionally, an electrical box is mounted to the wall stud so that the outer edge of the box is flush with the outer surface of the wall substrate, thereby meeting the code requirement for continuity. The installer must accurately locate the position of the box based on the wall substrate thickness. As various wall substrate thicknesses are in common use, a mounted box may need to be removed and reposition if the substrate thickness is not compatible.

The conventional procedures for installation of electrical boxes and formation of substrate openings therefore thus involve a considerable expenditure of time and effort. Needs exist for a more accurate and easier way to facilitate installation of electrical devices in building walls, both in the formation of the substrate opening and in the provision of support for the electrical devices.

SUMMARY OF DISCLOSURE

The needs described above are fulfilled, at least in part, by an assembly including a box and a removable sleeve that is engageble with the box and with a wall substrate to secure tight contact between the wall substrate and the box structure, irrespective of the thickness of the wall substrate. The sleeve is configured to be coupled to an electrical device having a corresponding configuration for insertion in the box.

The box has a front side formed with a cutout segment having a periphery that defines the opening to be made in the wall substrate. The surface of the front side of the box is positioned even with the edge of the wall stud, thereby being flush with the inner surface of the wall substrate. The dimensional area of the front surface of the box extends beyond the cutout segment so that the volume of the box enclosure is greater than the volume bounded by the cutout segment alone. The cutout segment periphery may be formed with an inwardly directed flange that serves as a template guide for cutting the wall substrate opening.

The sleeve is insertable in the box through the opening in the wall substrate and the cutout segment of the front side of the box. Areas of the front side of the box at opposite locations of the cutout segment contain slots or like openings though which are linked retainers for mating with an outer longitudinal surface of the sleeve. The outer longitudinal surface of the sleeve contains teeth spaced along its extent that mate with the box retainers. A flange at the outer end of the sleeve overlaps the wall opening to abut the outer surface of the wall substrate as the sleeve is inserted in the box to form a tight engagement between the wall substrate and the box. One or more runner elements formed along the outer sleeve surface stabilize the position of the sleeve within the box structure. The sleeve includes a provision for disengaging the box structure retainer from the teeth so that the sleeve for removal of the sleeve. A retractable pull mechanism may be provided in the box to facilitate removal. For example, a pull member may be slidably engaged with a slot in a side of the box.

An inner longitudinal surface of the sleeve is configured to hold the electrical device that is inserted therein. The electrical device comprises a housing containing an electrical component therein and an apparatus for tightly engaging the housing within the sleeve. The device is latched to the sleeve flanged when inserted to its extent. A sprung latch is configured with a sloped surface which yields contact with the flange of the sleeve until travel of the device clears the latch of the flange inner surface. A flat surface of the latch then maintains flush contact with the flange surface. One or more ribs on the exterior of the housing stabilize the position of the device within the sleeve. The device apparatus has provision for retracting the latch from the sleeve for removal of the device.

The assembly may accommodate a plurality of electrical devices. The box may contain a divider plate separating compartments for enclosing devices such as line voltage devices and communication devices. The divider plate may have an offset portion for abutment with a divider plate in the sleeve to compartmentalize the enclosures.

The sleeve flange may be configured with indented areas for engaging a coverplate for the electrical device to permit a snap-on engagement thereof. The electrical device housing may include an electrical connector integral to its exterior for coupling wiring to the electrical component therewithin. The connector is can mate with a wiring connector within the box. The connectors can be non-conductive, thereby avoiding a shock hazard. The device housing may contain a plurality of electrical wiring contacts in addition to the electrical connector as an alternative means of wiring connection. For example, a plurality of ports in the housing exterior can provide access to respective electrical wires of the box, the ports including retainers for the wires.

Additional advantages of the present disclosure will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

Various exemplary embodiments are illustrated by way of example, and not by way of limitation, in the figures of the accompanying drawings in which like reference numerals refer to similar elements and in which:

FIG. 1b is an exploded view of the assembly shown in FIG. 1a;

FIG. 1c is a top plan view of the assembly shown in FIG. 1a;

FIG. 3b is a front view of the device shown in FIG. 3a;

FIG. 4 is a perspective view of a portion of the assembly of FIG. 1a;

FIG. 5b is a side view of the device shown in FIG. 5a;

FIG. 6 is a perspective view of removal of the device of FIG. 5a;

FIG. 7 is a rear perspective of the device of FIGS. 3a and 5a;

FIG. 9a is front view of the sleeve shown in FIG. 1b;

FIG. 9b is a perspective view of the sleeve shown in FIG. 1b;

FIG. 9c is a top view of the sleeve shown in FIG. 1b;

FIG. 9d is a section view taken from FIG. 9a;

FIG. 10a is a side view of the box shown in FIG. 1b;

FIG. 10b is a section view taken from FIG. 10a;

FIG. 10c is a detail view taken from of FIG. 10b;

FIG. 10d is a perspective view of the box shown in FIG. 1b;

FIG. 10e is an enhanced perspective view of the box shown in FIG. 10d;

FIG. 10f is a detail view taken from FIG. 10e;

FIG. 11b is an exploded view of the assembly in FIG. 11a;

FIG. 12a is a modified partial perspective view of the assembly shown in FIG. 11a;

FIG. 12b a side view of the assembly shown in FIG. 12a;

FIG. 12c is a detailed perspective view of an element of the assembly shown in FIG. 12a;

FIG. 13a is a modified partial perspective view of a modification of the assembly shown in FIG. 11a;

FIG. 13b a side view of the assembly shown in FIG. 13a;

FIG. 13c is a detailed perspective view of an element of the assembly shown in FIG. 13a;

FIG. 14a is a front view of a portion of the assembly shown in FIG. 11a;

FIG. 14b is a section view taken from FIG. 14a;

FIG. 15 is a view of a tool operable with the assembly of FIG. 11a;

FIG. 16b is a front view of the assembly shown in FIG. 16a;

FIG. 16c is a section view taken from FIG. 16b;

FIG. 16d is a detailed view taken from FIG. 16c;

FIG. 17b is perspective view a removal operation of the device shown in FIG. 17a;

FIG. 17c is a front view of the embodiment shown in FIG. 17a;

FIG. 17d is a section view taken from FIG. 17c;

FIG. 21b is a side view of the embodiment shown in FIG. 21a;

FIG. 22b is a front view of the assembly shown in FIG. 22a;

FIG. 23a is a side view of a bracket element of the assembly shown in FIG. 22a;

FIG. 23b is a front view of the bracket shown in FIG. 23a;

FIG. 23c is a perspective view of the bracket shown in FIG. 23a;

FIG. 23d is a top view of the bracket shown in FIG. 23a;

FIG. 24a is a side view of an alternative box for the assembly shown in FIG. 1a;

FIG. 24b is a front view of the box shown in FIG. 24a;

FIG. 24c is a perspective view of the box shown in FIG. 24a;

FIG. 24d is a top view of the box shown in FIG. 24a;

DETAILED DISCLOSURE

Figure 1A:
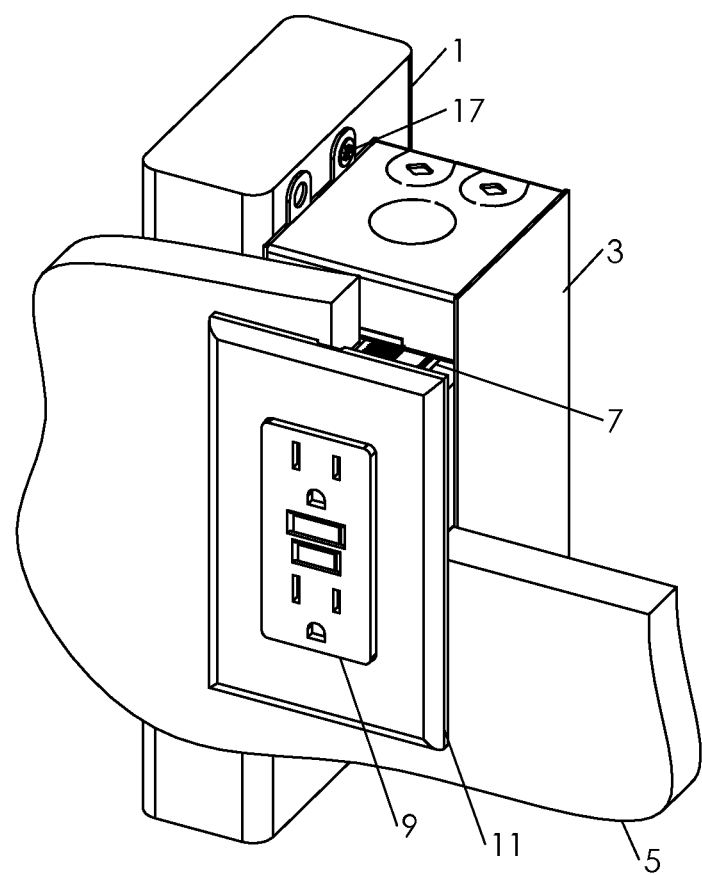
FIG. 1a is a perspective view of a line voltage electrical device installation.
Figure 1B:
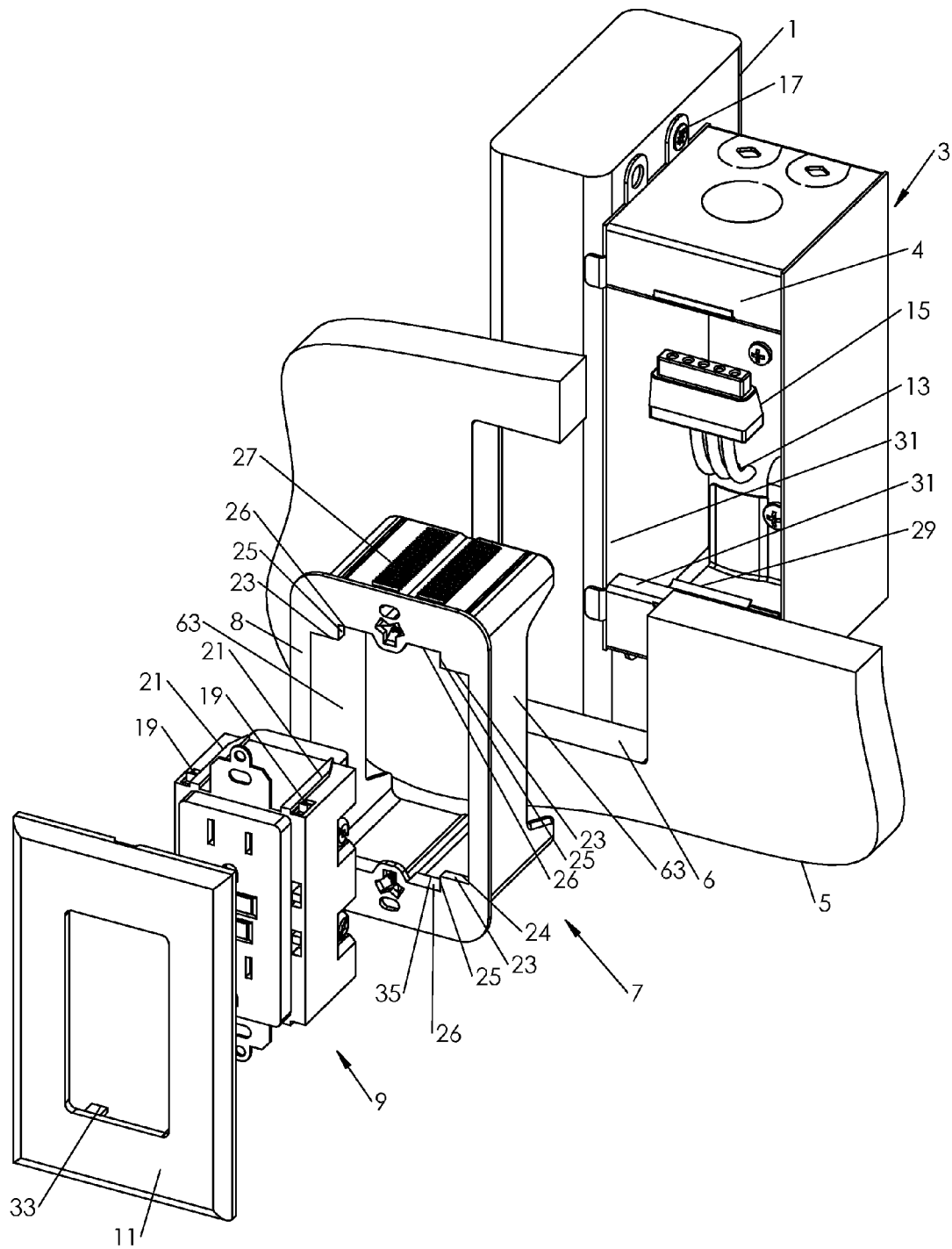
Figure 1C:
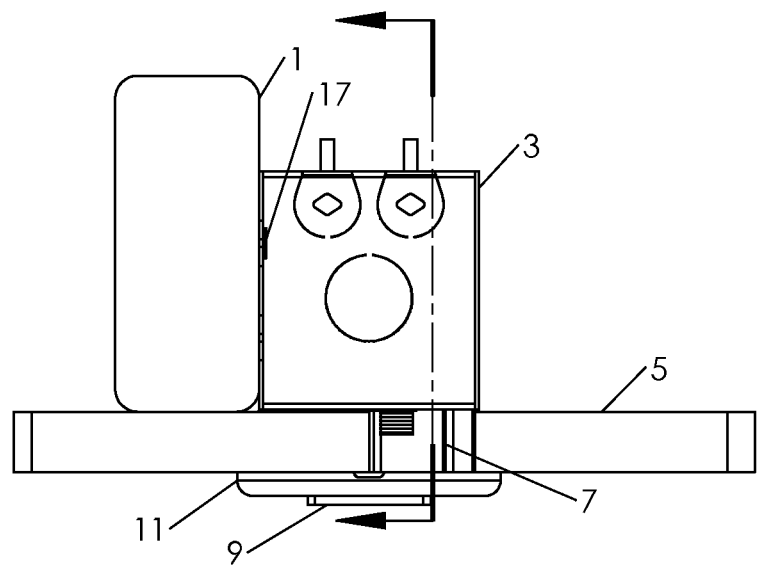
Figure 1D:
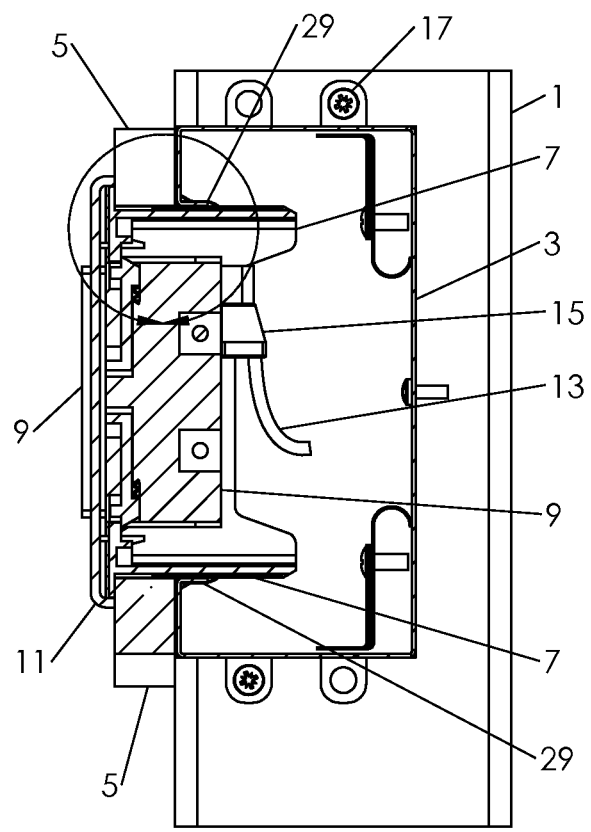
FIG. 1d is a section view taken from FIG. 1c.
Figure 1E:
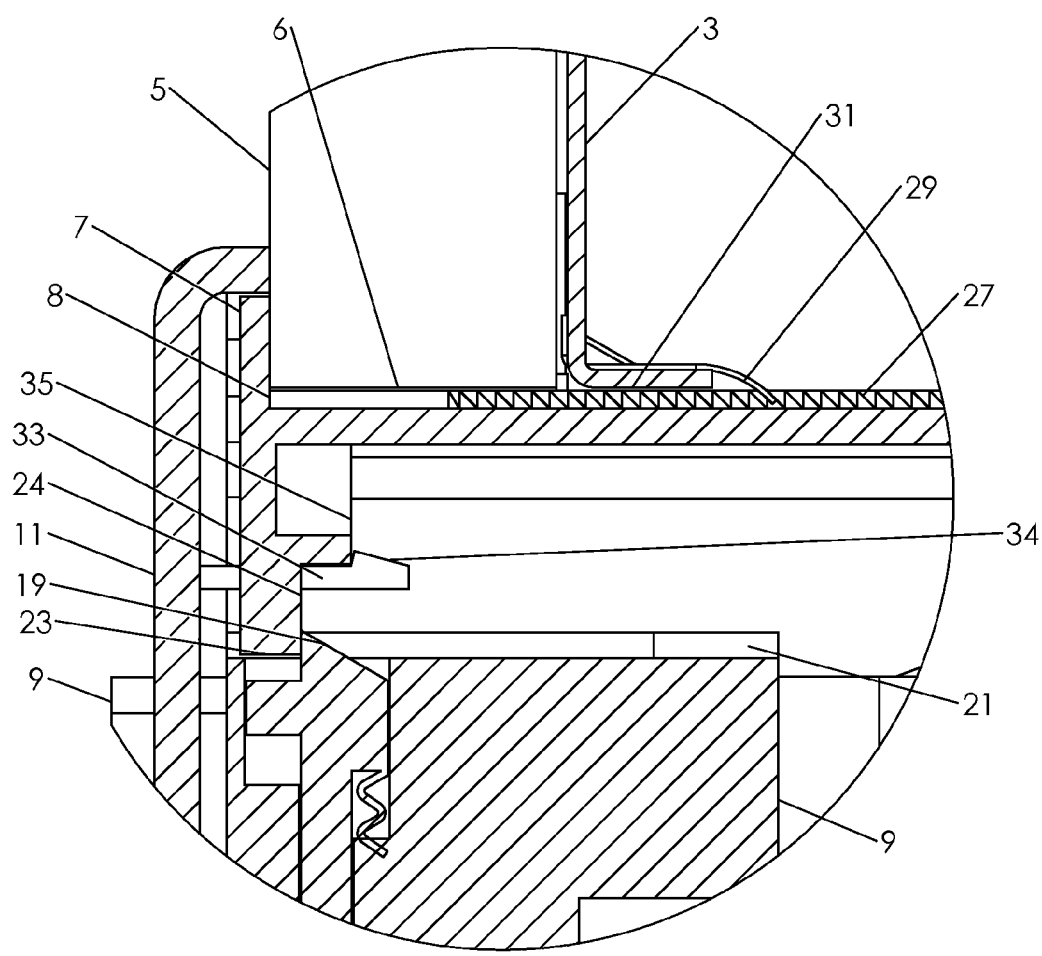
FIG. 1e is an enlarged view of a portion of FIG. 1d.
Figure 2A:
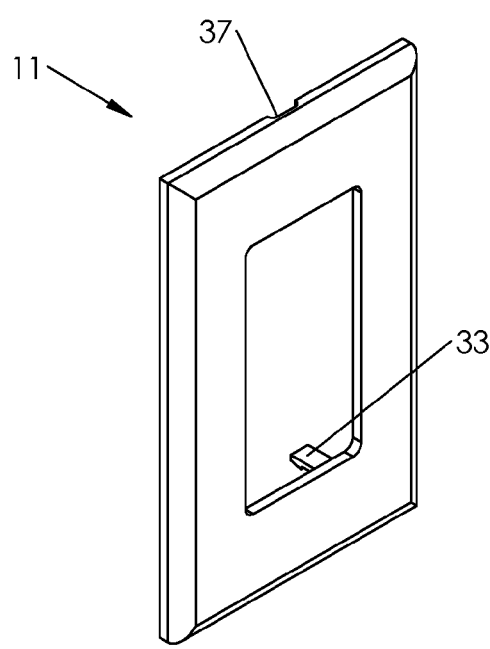
FIGS. 2a-e are various views of the cover plate of FIG. 1b, shown in detail.
Figure 2B:
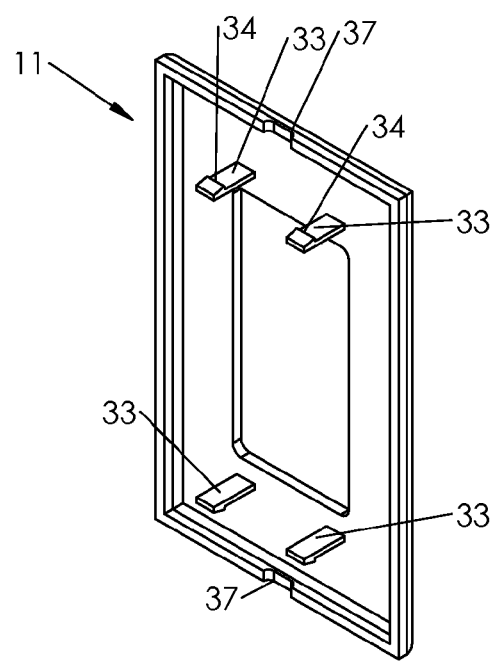
Figure 2C:
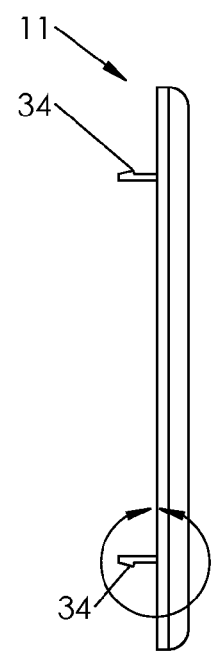
Figure 2D:
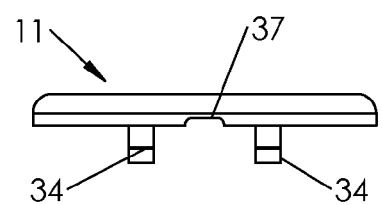
Figure 2E:
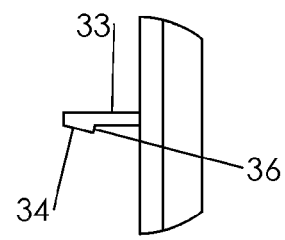
Figure 3A:
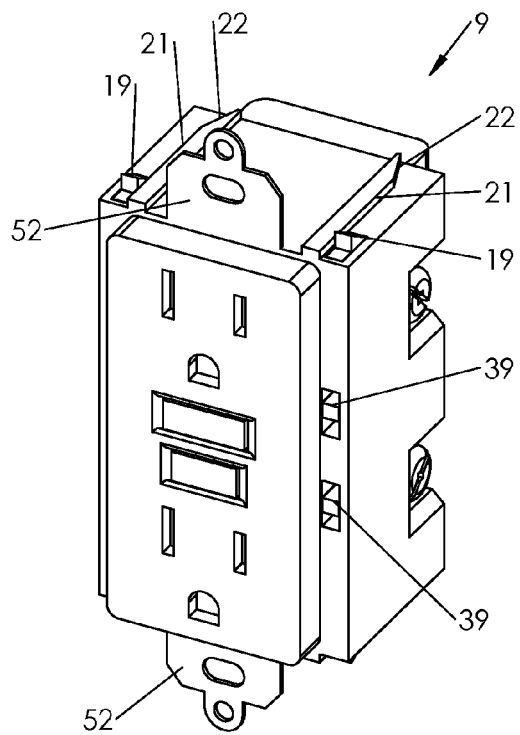
FIG. 3a is a perspective view of the device shown in FIG. 1b.
Figure 3B:
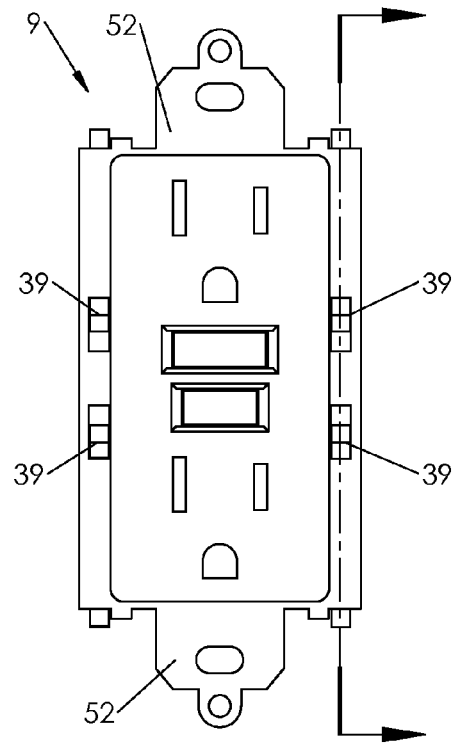
Figure 3C:
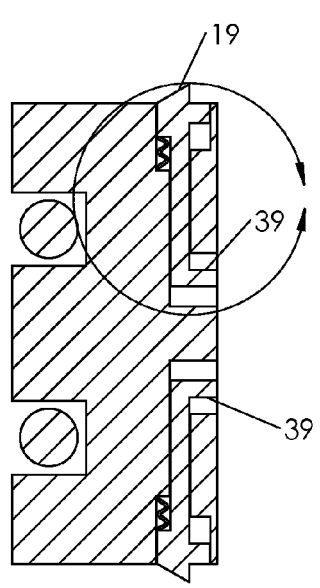
FIG. 3c is a section view taken from FIG. 3b.
Figure 3D:
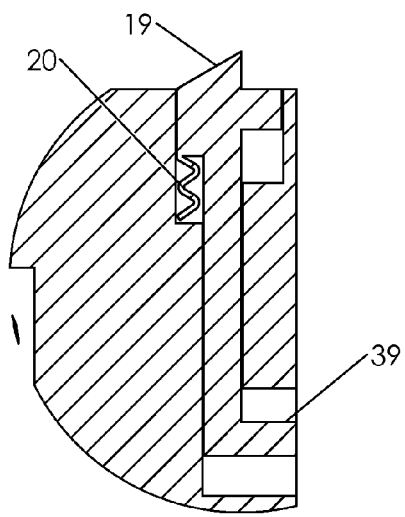
FIG. 3d is an enlarged view of a portion of FIG. 3c.

FIGS. 1a-e show electrical box 3 mounted on stud 1 with fasteners 17. Drywall 5 is mounted on the studs 1. Hole 6 in drywall 5 or other wall substrate may be cut using a rotating cutting tool with a guide point running along box front inside perimeter wall 31 disclosed in U.S. patent application Ser. No. 13/690,849, filed Nov. 30, 2012. Sleeve 7 can be pushed through hole 6 in drywall 5 into box 3 until sleeve flange 8 contacts the front surface of drywall 5 or other wall substrate with any thickness such as, for example between one quarter inch to one and one quarter inch or greater. Sleeve 7 with perimeter wall, or flange surface, 63 serves to completely enclose the line voltage volume of the installation through the thickness of drywall 5 as is typically required by the electrical code regardless of whatever drywall 5 and cladding may be installed later. Sleeve 7 thus replaces the need to install a conventional electrical box proud of stud 1 by the thickness of drywall and cladding to be installed at a later time. Teeth 27, on the top and bottom of sleeve 7, ratchet beneath sprung retainers 29 on the top and bottom of the opening in box 3. Sprung retainers 29 are recessed within box 3, beyond perimeter wall 31, to avoid interference with a rotating cutting tool running along perimeter wall 31. Wires 13, whose routing out of box 3 has been truncated for clarity, can be pushed into connector 15 which is plugged into the back of electrical device 9. Electrical device 9 can be pushed into the opening in sleeve 7. Device guide ribs 21, shown on the top and bottom, locate device 9 within sleeve 7 as they contact horizontal guide surfaces 25 and vertical guide surfaces 26. Sprung latches 19, located on the four corners of device 9 retract as they slide beneath surface 23 and retain the device after expanding behind surface 24.

Additional views of sleeve 7 are shown in FIGS. 9a-d. Cover plate 11 is installed over device 9. Four sprung arms 33 that extend from the backside of cover plate 11 have retainer 34 that snap fit on surface 35.

FIGS. 2a-e show cover plate 11 with sprung arms 33 and retainers 34. Retainers 34 have a steep angled release surface 36 that allows cover plate 11 to be removed by inserting a screwdriver or the like through recess 37 and prying cover plate 11 from sleeve 7.

Figure 4:
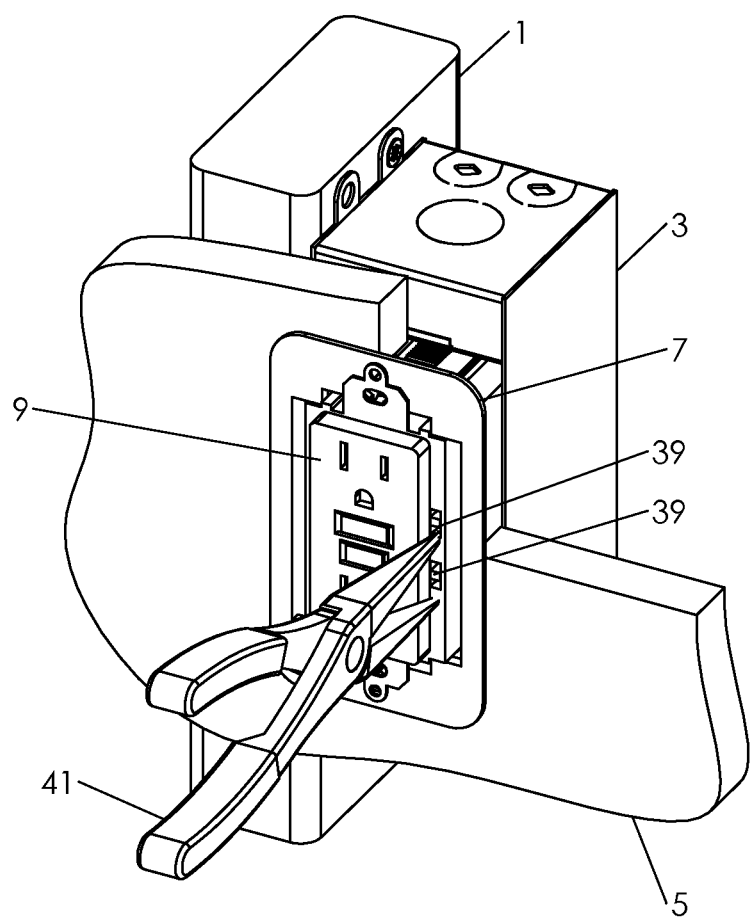
Figure 5A:
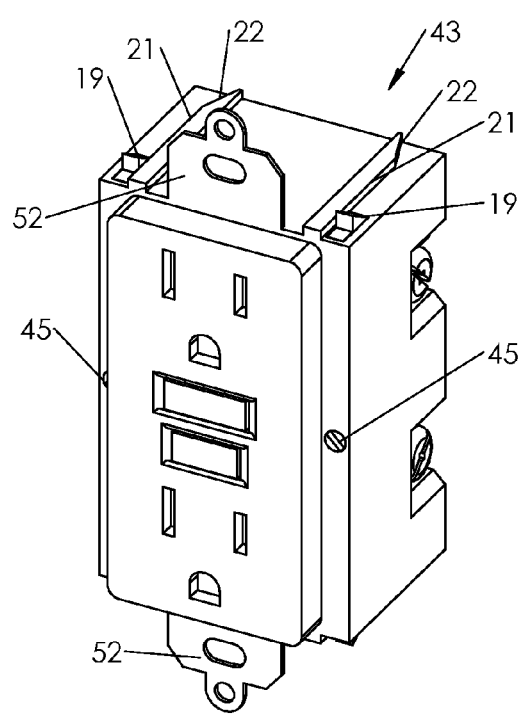
FIG. 5a is a perspective view of an alternative device embodiment.
Figure 5B:
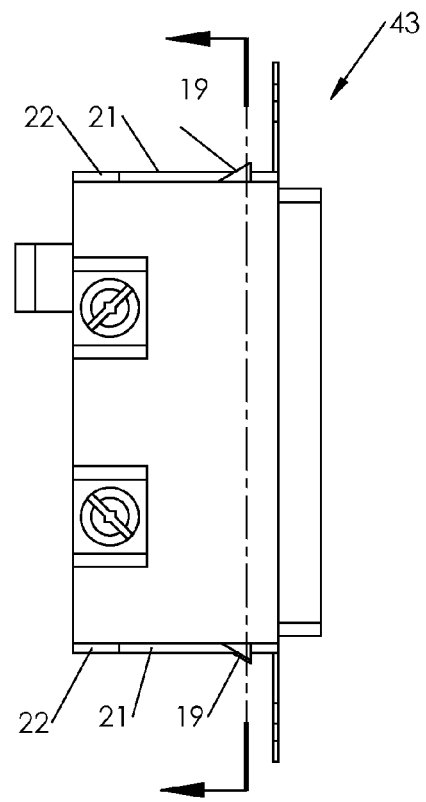
Figure 5C:
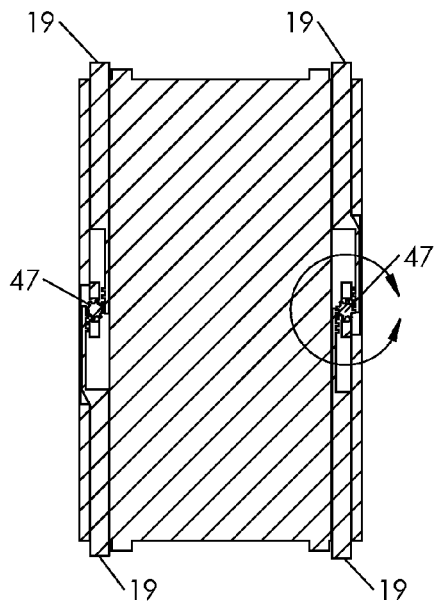
FIG. 5c is a section view taken from FIG. 5b.
Figure 5D:
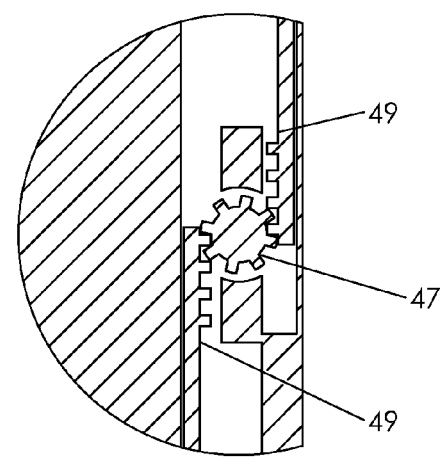
FIG. 5d is an enlarged view of a portion of FIG. 5c.

FIGS. 3a-d show electrical device 9 with latches 19. Guide ribs 21 have chamfer 22 which facilitate insertion and centering of device 9 in sleeve 7 shown in FIGS. 1a-e. In a multi-gang installation having devices spaced appropriately on the sleeve, this allows for ease of installation of the cover plate without adjustment. Device 9 has conventional mounting plates 52 on the top and bottom to permit mounting using screws in the conventional manner to a conventional box, as an alternative to box 3 and sleeve. A conventional cover plate can be fastened with screws to mounting plate 52 of device 9 in the conventional manner Latches 19 cooperate with springs 20 and release buttons 39. When buttons 39 are pushed springs 20 are compressed, thereby retracting latches 19 and disengaging them from the sleeve to permit removal of device 9 from sleeve 7. FIG. 4 shows the removal of device 9 from sleeve 7 using needle-nose pliers 41 on buttons 39 to retract latches 19.

Figure 6:
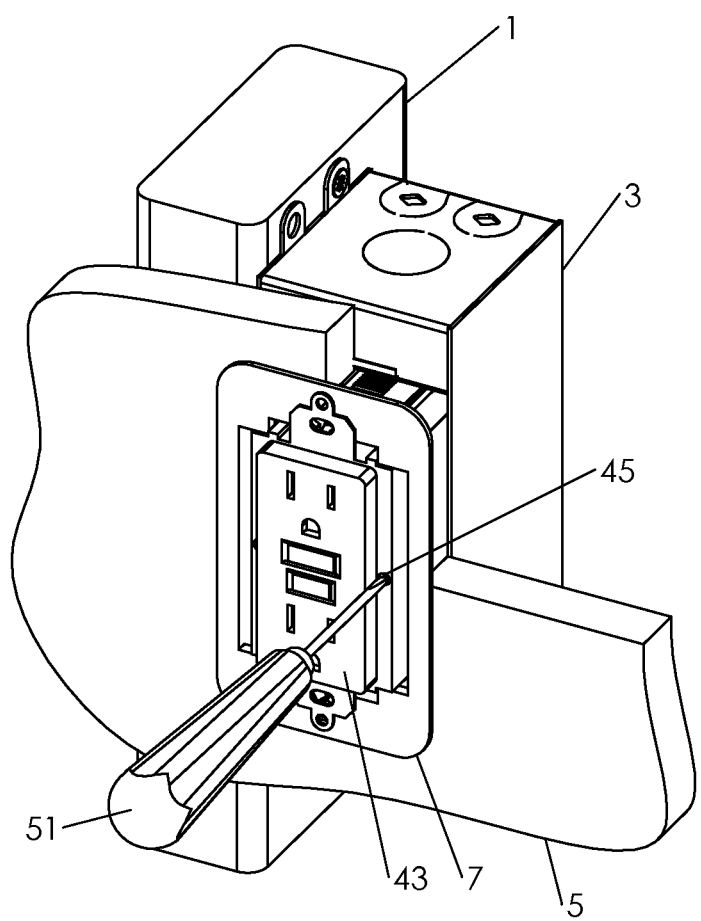

An alternative embodiment is shown in FIGS. 5a-e. Device 43 differs from device 9 in its removal means. Latches 19 of device 43 are retracted by rotating clockwise slotted shaft 45 with pinion 47, which drives racks 49. Rack 49 is directly connected to latch 19 which is spring loaded in the same manner as device 9 shown in FIG. 3d. FIG. 6 shows the removal means of device 43 from sleeve 7 by using slotted screwdriver 51 to rotate shaft 45.

Figure 7:
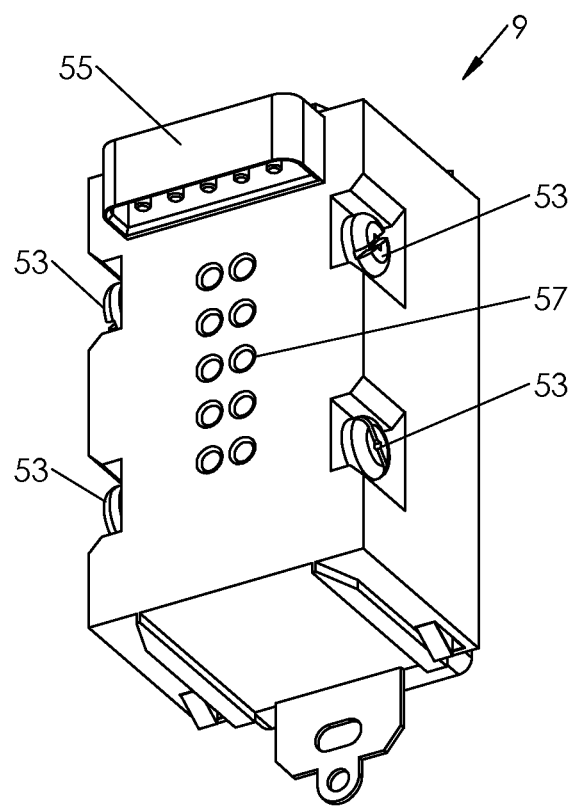
Figure 8:
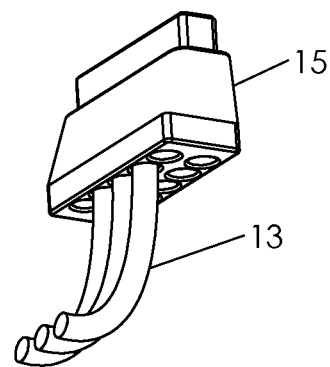
FIG. 8 is a view of a male electrical connector shown in FIG. 1b.

FIG. 7 shows the backside of device 9, which provides three means of wiring access to the box. While screws 53 may be conventional wire clamps, the screws may be non-conductive to avoid shock hazard. Push-in wire sockets 57 clamp the suitably sized wire upon insertion. Barbed retainers (not shown) in sockets 57 retain the wire. Female connector 55, integral to device 9, is mateable with male connector 15 shown in FIG. 8. Male connector 8 is shown with truncated push-in wires 13. In this instance, since the connectors may be non-conductive, device 9 can be replaced from the installation without exposure to live contacts, as screws 53 can be insulated when formed of a thermoplastic or thermoset material or the like. Alternatively, screw 53 may be made of an electrically conductive material with a head whose top surface is a non-conductive material. Alternately, a conventional screw 53 can be isolated electrically from the device with a non-conductive plate which compresses the contact but isolates screw 53.

Multiple views of plastic injection molded sleeve 7 are visible in FIGS. 9a-d. Ratchet threads 59 facilitate mounting of conventional electrical devices by allowing mounting screws to be pushed in and tightened with a screwdriver. Outboard of the ratchet threads are clearance holes 61 that provide clearance for conventional cover plate mounting screws on the taped holes of conventional electrical device. Clearance holes 61 and keyway 62 also provide access for sleeve 7 removal as shown in FIGS. 16a-d. Guide rails 65 ensure that sleeve 7 remains vertically positioned with box 3.

Box 3 shown in FIGS. 10a-f contains additional volume at the top and bottom portions in comparison with conventional wide device boxes. The additional volume facilitates wiring and device installation and provides clearance for sleeve 7 insertion without interference with conduit fittings or wire cladding strain relief in the top and bottom of box 3. Sprung retainers 29 may be made of spring steel and inserted through slots 28. Sprung retainer 29 is held in position by flange 67 and sprung detent 32 on either side of box front surface 4. Alignment tabs 30 allow box 3 to be located on the stud so that the front surface 4 is flush with stud 1 shown in FIGS. 1a-e.

Figure 11A:
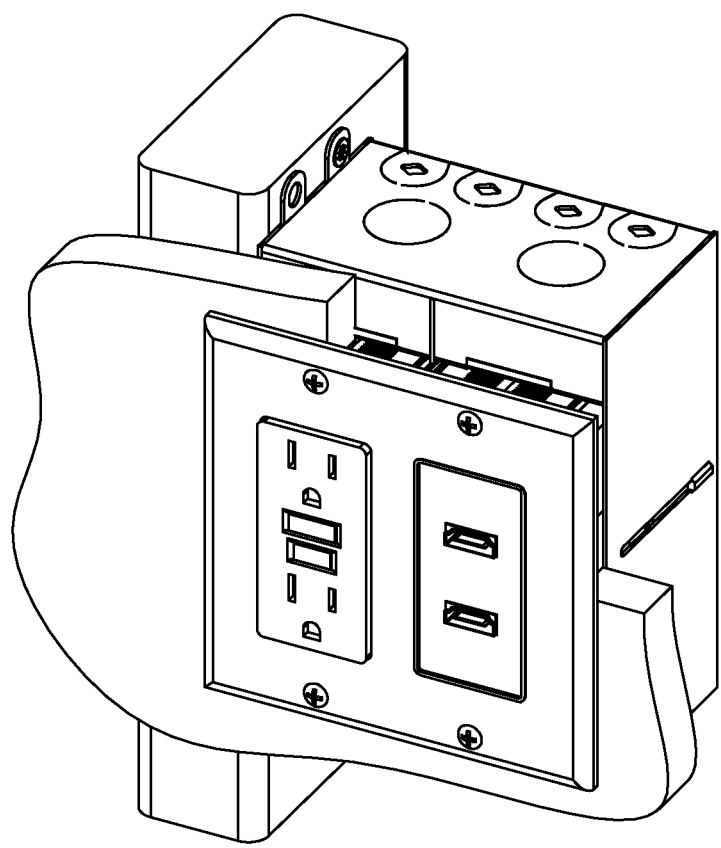
FIG. 11a is a perspective view of an alternative electrical device installation.
Figure 11B:
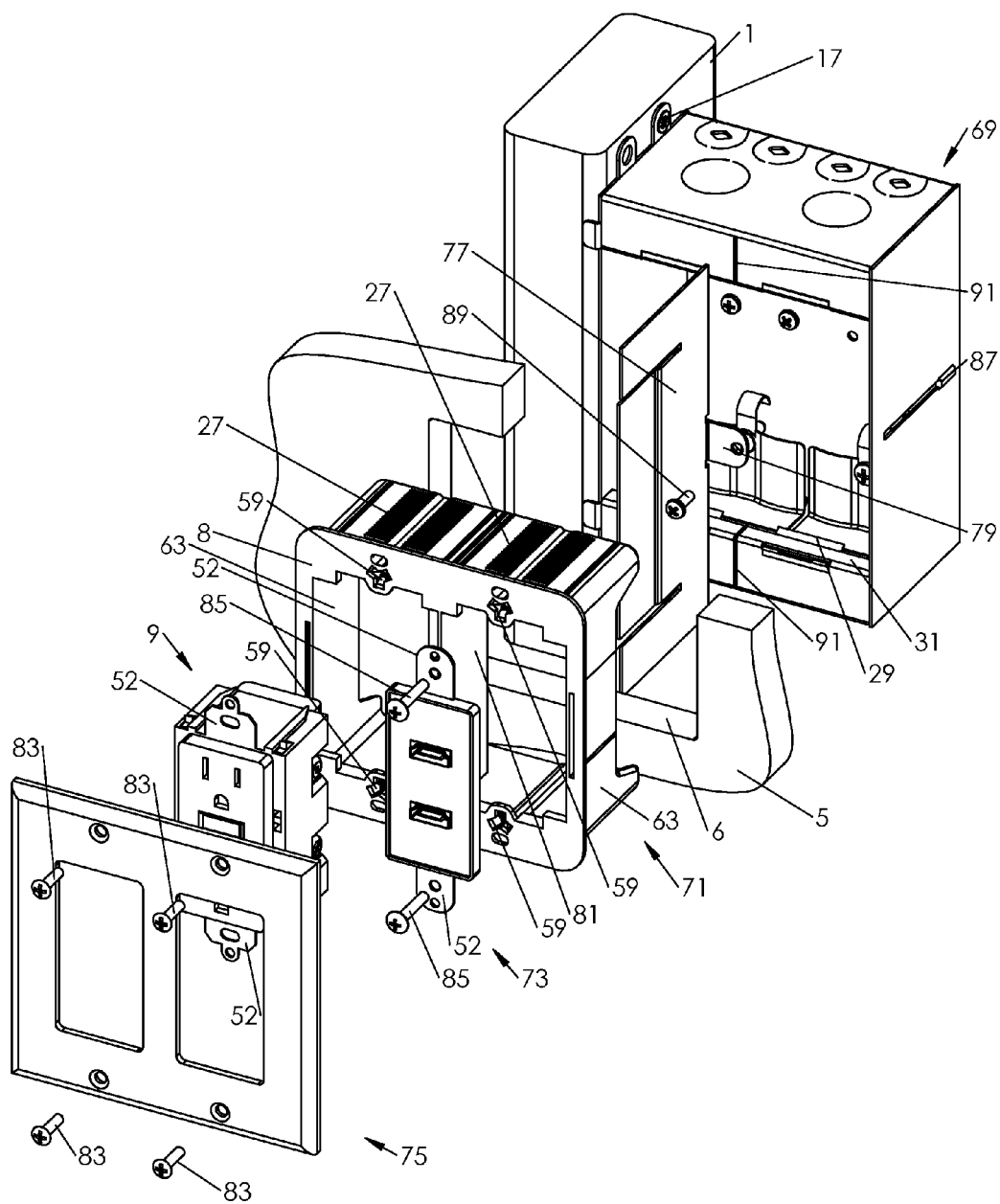

FIGS. 11a-b depict a two gang dual voltage device installation using two gang box 69 mounted to stud 1 with fasteners 17. Divider plate 77, used for isolation of differing voltage devices, is slid through slots 91 and held in place via screw 89 in tab 79 threaded into the back wall of box 69. Opening 6 in drywall 5 or other wall substrate may be cut using a rotating cutting tool with a guide point running along box front inside perimeter wall 31. Two gang sleeve 71 may be pushed through opening 6 in drywall 5 into box 69 until sleeve flange 8 contacts the front surface of drywall 5. Sleeve 71 with perimeter wall 63 serves to completely enclose the line voltage volume of the installation through the thickness of drywall 5 as typically required by the electrical code. Sleeve 71 has integral divider plate 81 which, in conjunction with box divider plate 77, serves to isolate the differing voltage devices, as shown more clearly in FIGS. 14a-c. Integral divider plate 81 can be cut or broken away if desired. Sleeve 71 thus replaces the need to install a conventional electrical box proud of stud 1 by the thickness of drywall and cladding to be installed. Teeth 27, on the top and bottom of sleeve 71, ratchet beneath sprung retainers 29 on the top and bottom of the opening in box 3. Wiring is not shown in this embodiment. Electrical device 9 is pushed into the left opening in sleeve 71 as described in FIGS. 1a-e. Conventional low voltage device 73, e.g. HDMI sockets, may be installed on the right hand side of sleeve 71 using fasteners 85 through device mounting plate 52 into ratchet threads 59. Cover plate 75 is installed over devices 9 and 73 using screws 83 into the outside taped hole of device mounting plates 52. Alternatively, a low voltage device with snap-in features similar to the latches on device 9 could be installed in sleeve 71. A two gang version of snap-on cover plate 11 may be used in this installation regardless of whether conventional or snap-in devices are used.

FIGS. 12a-c illustrate a plastic injection molded pull 87 that ensures effective securing of sleeve 71 in box 69 by sandwiching drywall 5 between sleeve flange 8 and box front surface 4. By pulling on pull 87 while pushing sleeve 71 into box 69, the non-stud side of box 69 is held motionless allowing sleeve teeth 29 to be engaged by box sprung retainer 29 at full penetration. The stud side of the box is held motionless by stud 1. Pull 87 has slider 95 that snaps-into and travels along slot track 93. Sleeve 99 has slots 99 that pull 87 extends out from. Finger hole 97 in pull 87 facilitates pulling. Pull 87 retracts sufficiently to allow the rotating cutting tool to pass without obstruction and to permit the cover plate to be installed over it. After sleeve 71 is secured in box 69 pull 87 is pushed back into box 69. This provision avoids the need for the conventional stand-off that is used on the non-stud side on the backside of a multi-gang electrical box to secure the box.

Figures 13A, 13B:
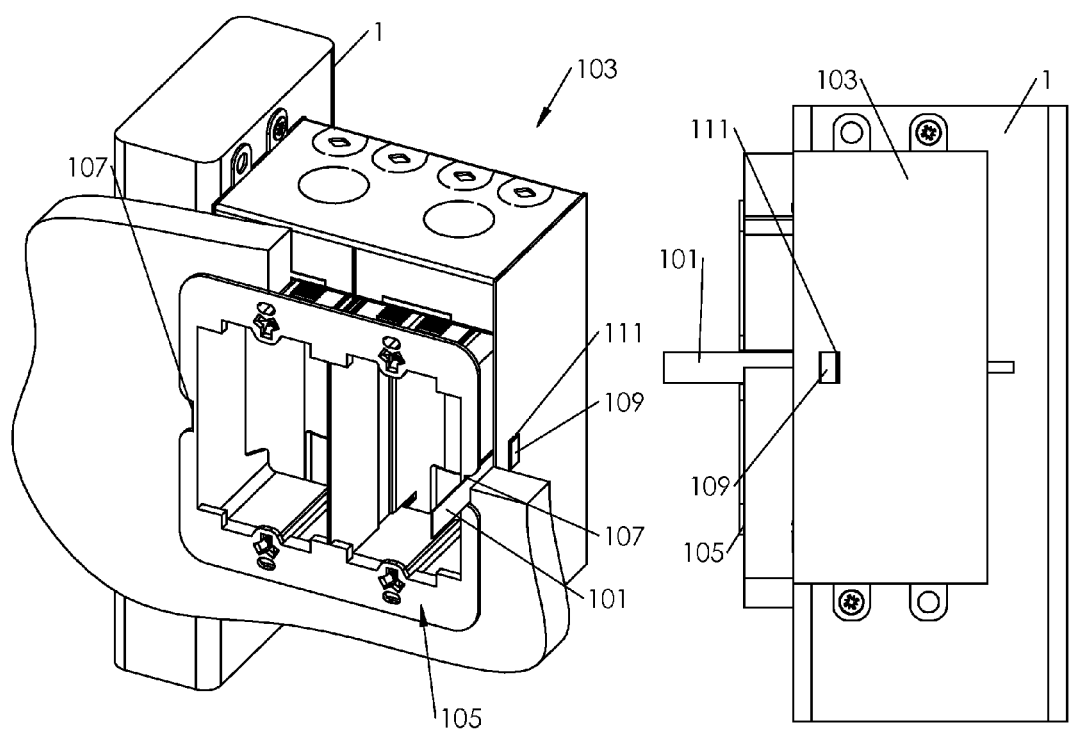
Figure 13C:
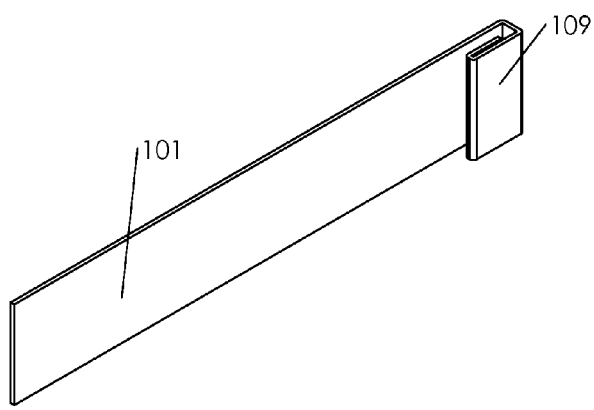

Alternatively to the illustrated pull 87, a living hinge can be provided to permit retraction, as is shown in FIGS. 13a-c. Pull 101 made of webbing or a strip of plastic sufficiently flexible to permit retraction or stuffing into box 103. Pull 101 can either be pushed back into box 103 after insertion of sleeve 105 or alternatively can be cut off. Sleeve 105 has recesses 107 to facilitate passage of pull 103. Sleeves 69 and 105 may be horizontally and vertically symmetrical to allow installation with either side against stud 1. During box assembly, pull 101 can be inserted through hole 111 in the side of box 103 and retained in position by stop 109.

Figure 14A:
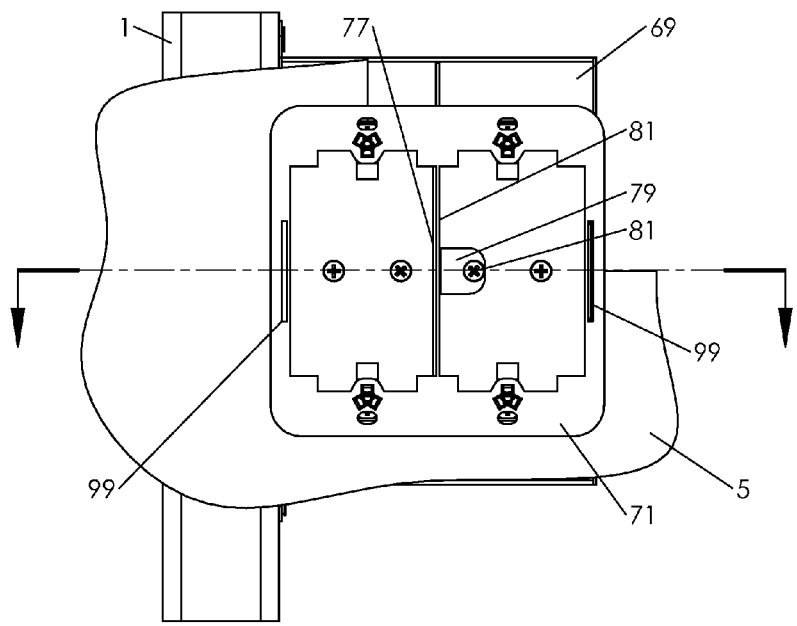
Figure 14B:
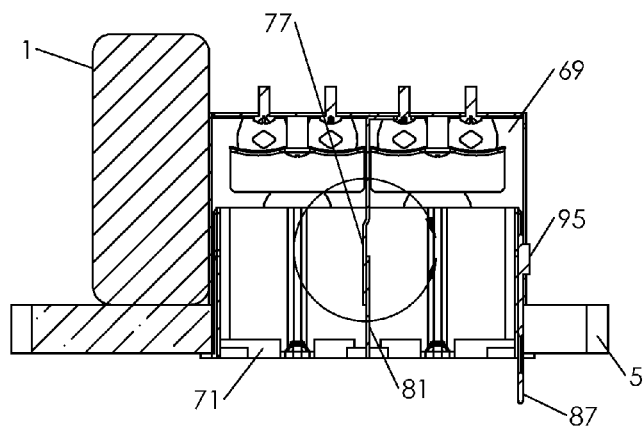
Figure 14C:
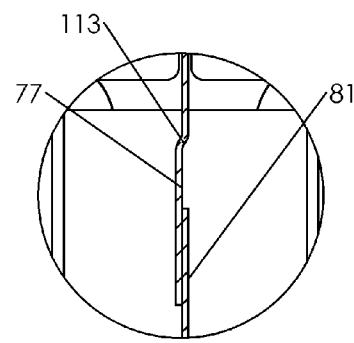
FIG. 14c is a detail view taken from FIG. 14b.

FIGS. 14*a-c* illustrate a two gang box 69 with divider plate 77 mounted on stud 1 and two gang sleeve 71 with integral divider plate 81 sandwiching drywall 5, as shown in FIGS. 11*a-b* and FIGS. 12*a-b*. Box divider plate 77 has jog offset 113 that allows it to run alongside integral sleeve divider plate 81 and compartmentalize left and right sides of the dual voltage installation regardless of drywall 5 thickness.

Figure 15:
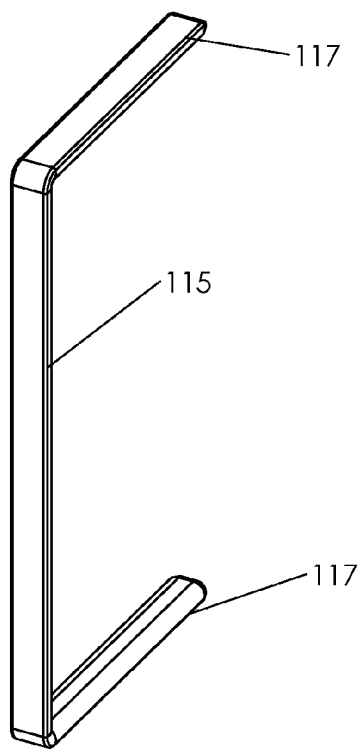
Figure 16A:
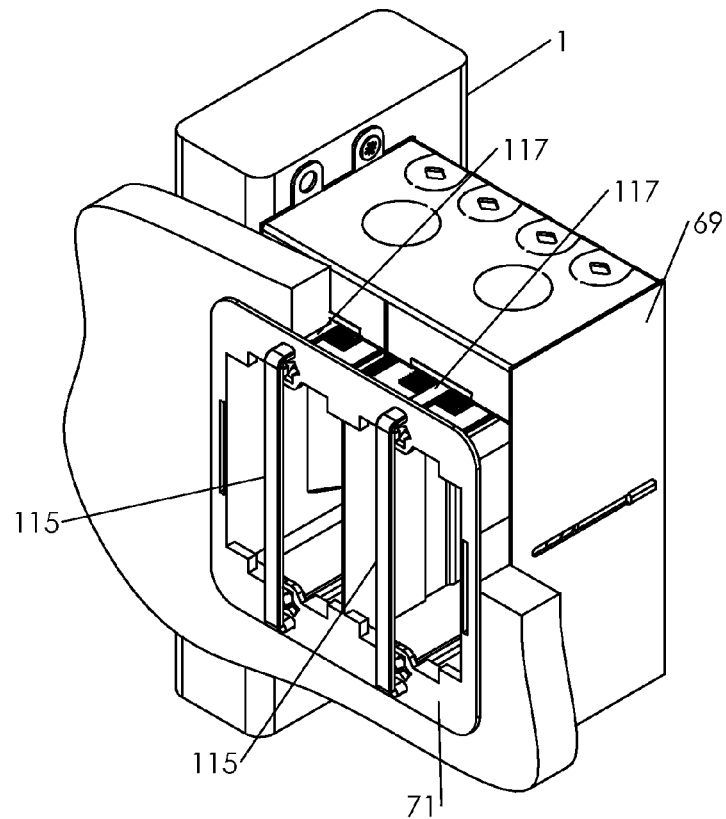
FIG. 16a is a perspective view of application of the removal tool shown in FIG. 15.

FIG. 15 shows sleeve removal tool 115 with prongs 117. A screwdriver or similar tool can also be used to remove the sleeve. FIGS. 16*a-d* show sleeve removal tools 115 with prongs 117 inserted through clearance holes 61 into keyways 62 on sleeve 69 to deflect and release sprung retainers 29 on box 69 from teeth 27 and permit removal of sleeve 71. On a three or more gang installation, box sprung retainers 29 and sleeve teeth 27 may not be needed for each gang. For example, the middle gang of a three gang installation may not require retention, facilitating removal by only having to release two pairs of retainers.

Figure 17A:
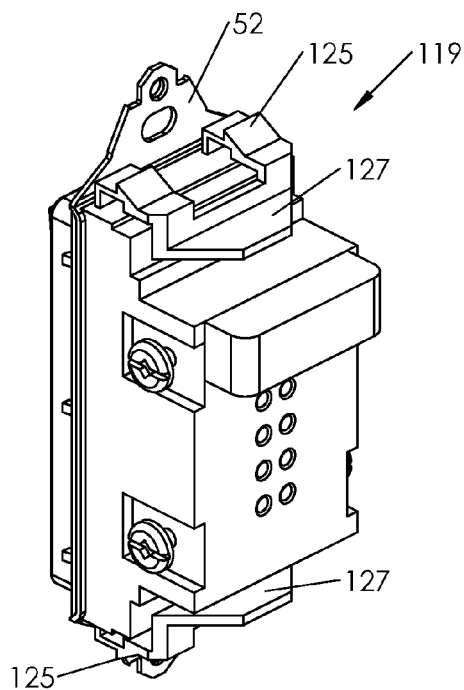
FIG. 17a is a rear perspective view of an alternate device embodiment.
Figure 17B:
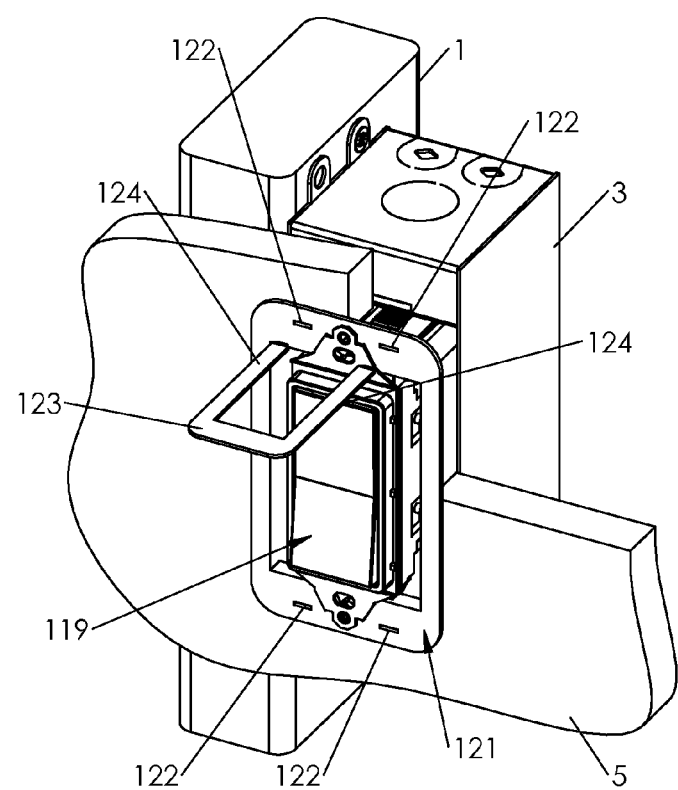
Figures 17C, 17D:
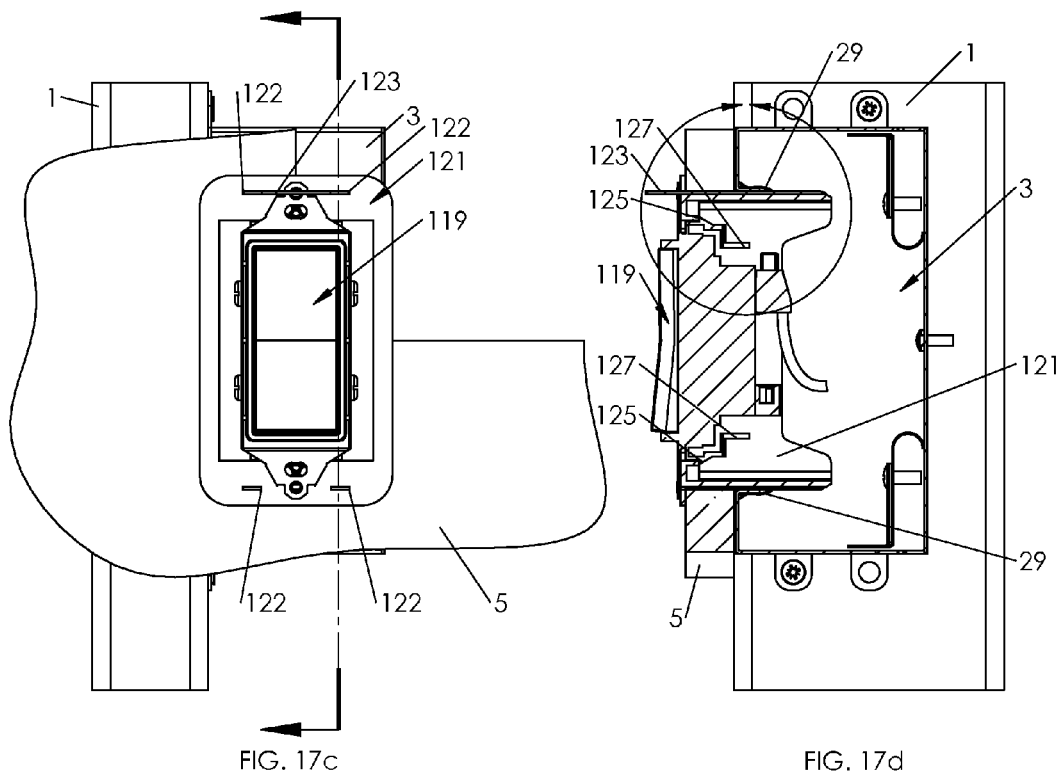
Figure 17E:
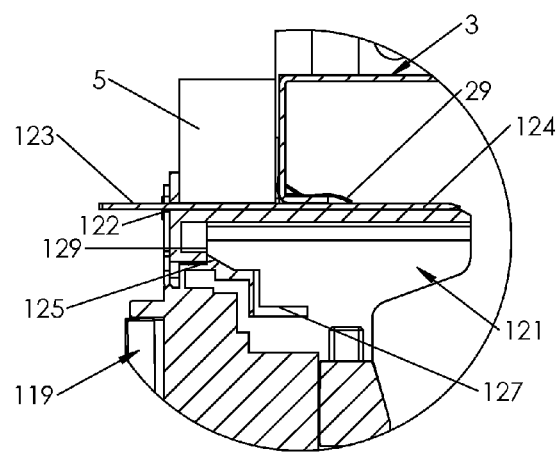
FIG. 17e is a detail view taken from FIG. 17d.

FIG. 17*a* illustrates an alternate embodiment to the snap in devices shown in FIG. 3 and FIG. 5. Device 119 is installed in sleeve 121, which is mounted in box 3 in the same manner as sleeve 7 shown in FIGS. 1*a-e*. Device 119 has sprung latches 125 that are compressed as it is pushed into sleeve 121 and are retained on surface 129. Removal of device 119 requires removal of sleeve 121 from box 3 to gain access to latch removal levers 127. Removal of sleeve 121 from box 3 is accomplished by inserting prongs 124 of tool 123 into slots 122 to deflect and release sprung retainers 29 on box 3 from sleeve teeth 27. By compressing lever 127 toward the middle of device 119 from the rear of the device, using opposing thumb and index finger or the like, latches 125 retract and device 119 can be removed from sleeve 121. Device 119 can also be mounted with screws through plate 52 in a conventional manner into a conventional electrical box. Sleeve 121 can also accommodate a conventional electrical device.

Figure 18:
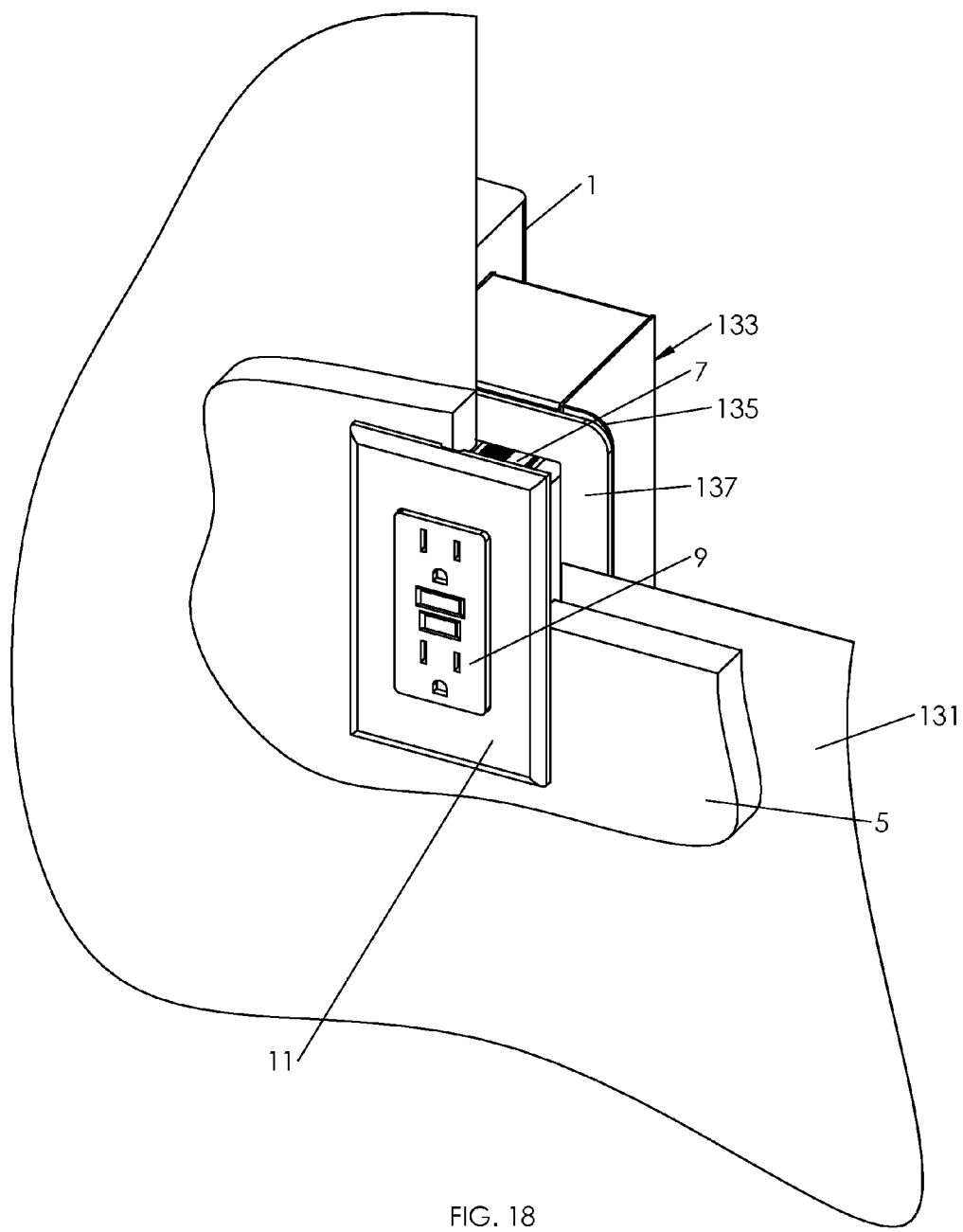
FIG. 18 is a perspective view of an alternative embodiment.
Figure 19:
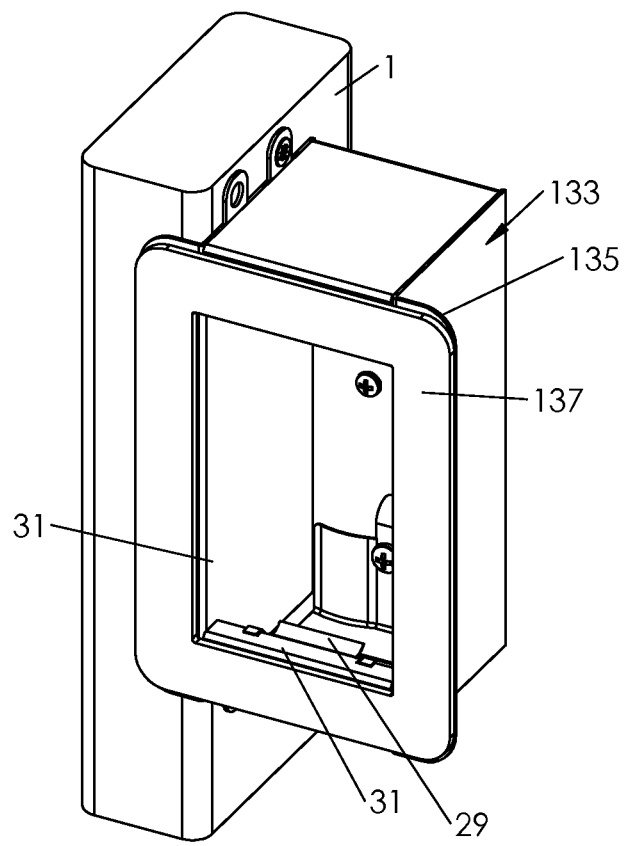
FIG. 19 is a perspective view of a portion of the embodiment shown in FIG. 18.

FIGS. 18 and 19 depict a hermetically sealed electrical box 133 with flange 135 and foam gasket 137 that seals vapour barrier membrane 131 when drywall 5 is installed thereon. Front inside perimeter wall 31 allows a rotating cutting tool to cut drywall and vapour barrier membrane 131 to the appropriate size and location as described with respect to FIGS. 1*a-e*. Subsequently sleeve 7, electrical device 9 and cover plate 11 are installed as shown in FIGS. 1*a-e*. A conventional device and/or cover plate could be installed in/on sleeve 7.

Figure 20:
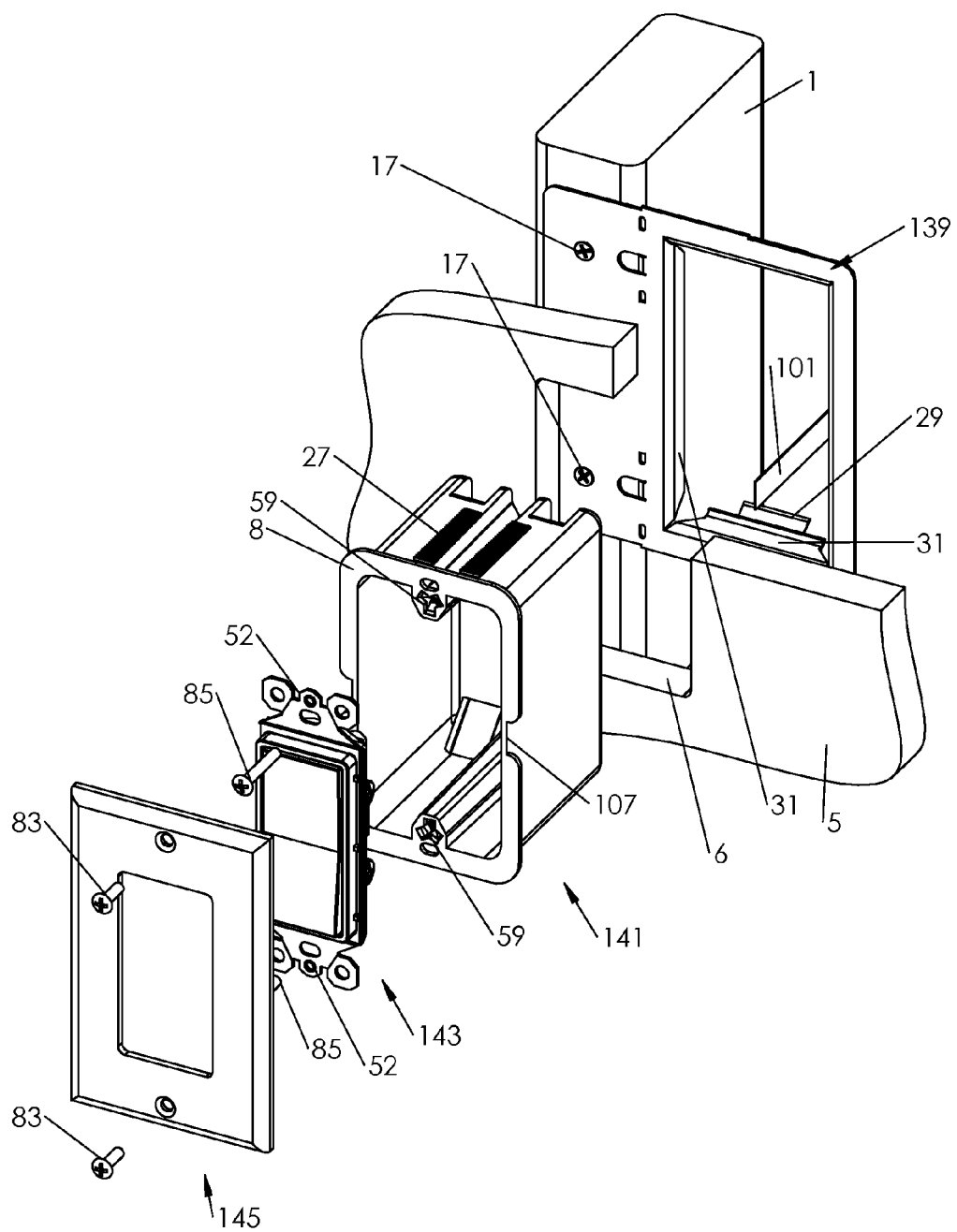
FIG. 20 is an exploded view of another assembly embodiment.
Figure 21A:
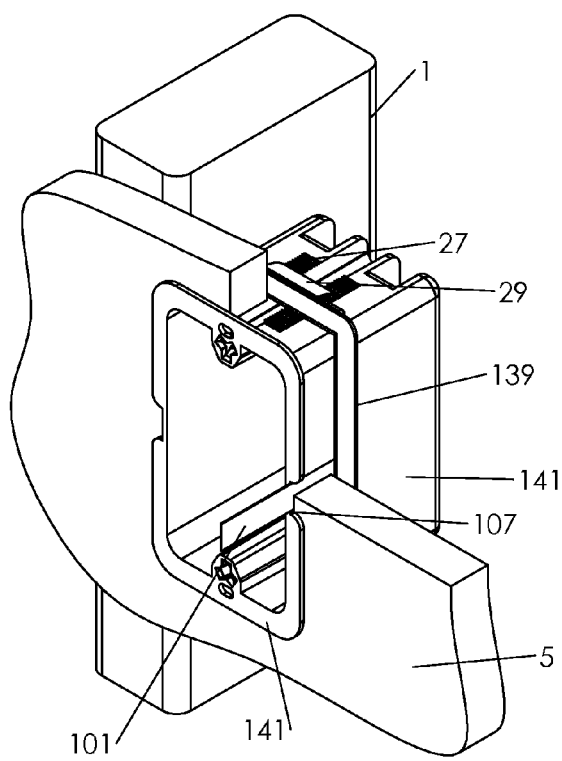
FIG. 21a is a perspective view of a portion of the embodiment shown in FIG. 20.
Figure 21B:
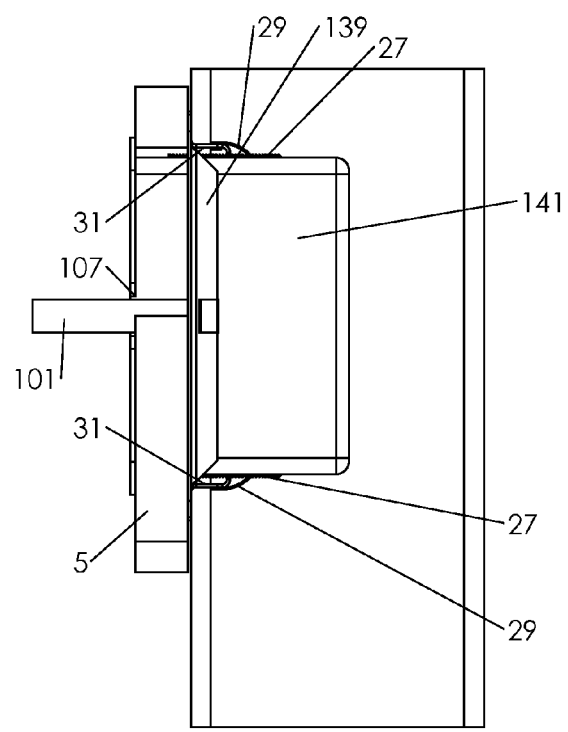
Figure 22A:
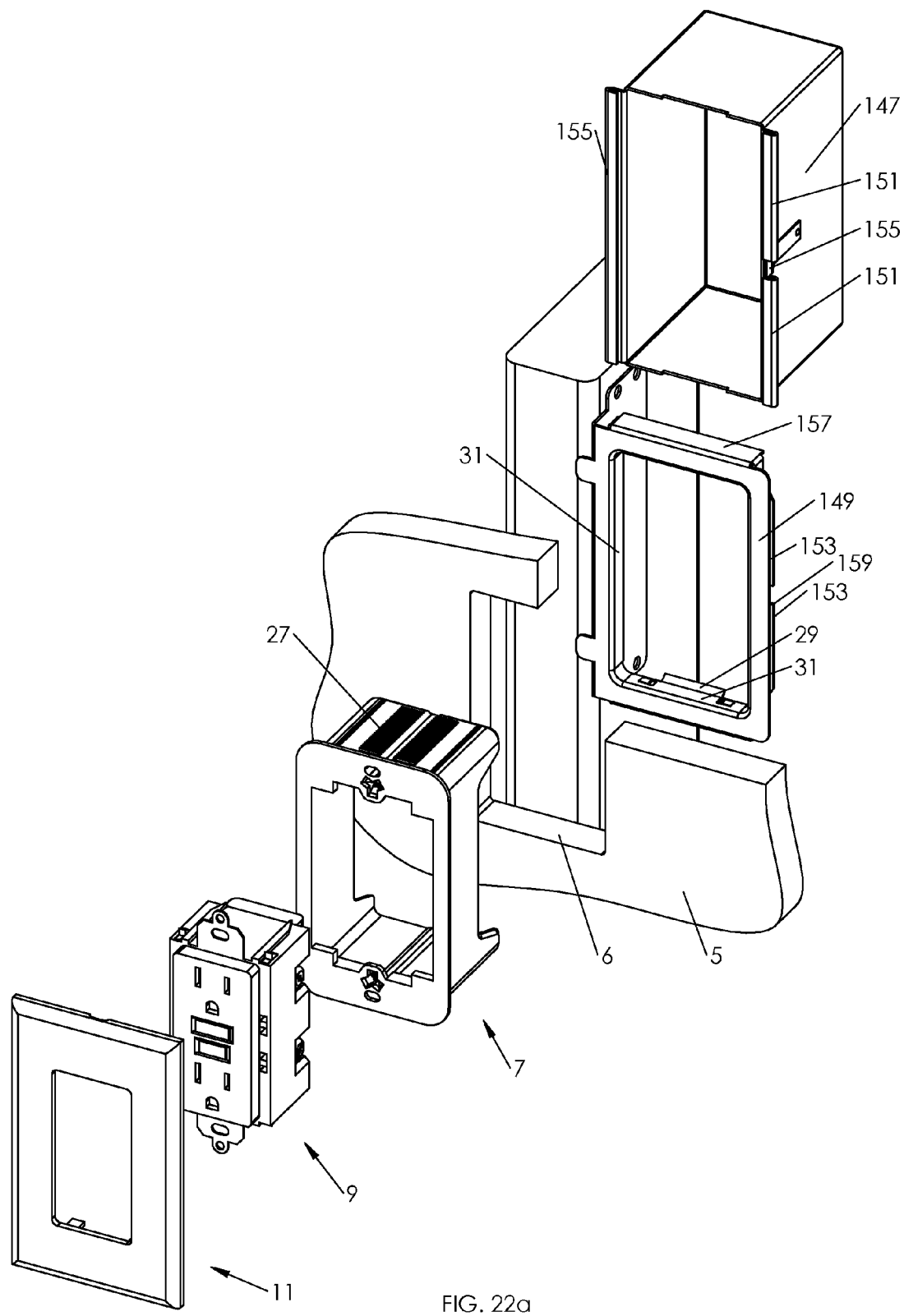
FIG. 22a is an exploded view of an additional assembly embodiment.
Figure 22B:
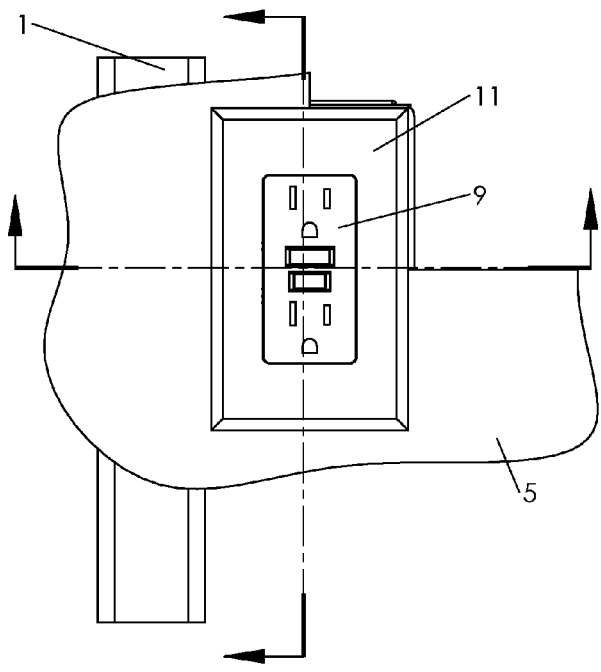
Figure 22C:
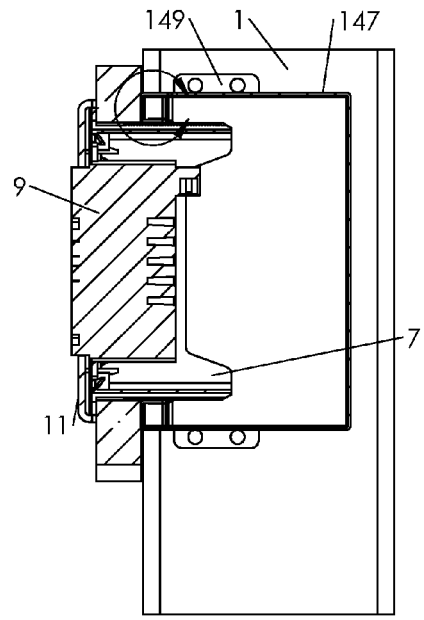
FIG. 22c is a vertical section view taken from FIG. 22b.
Figure 22D:
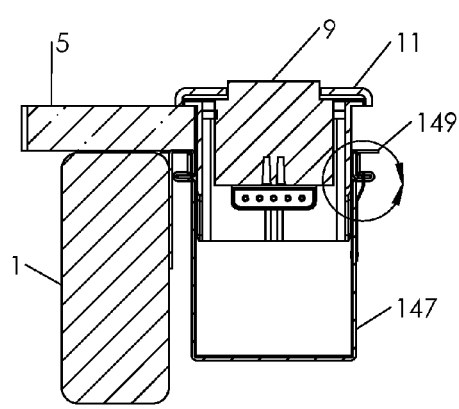
FIG. 22d is a horizontal section view taken from FIG. 22b.
Figure 22E:
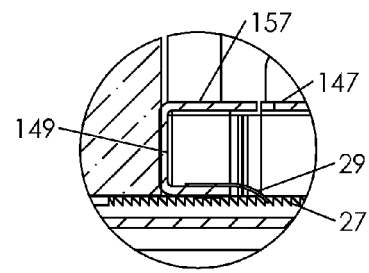
FIG. 22e is a detail view taken from FIG. 22c.
Figure 22F:
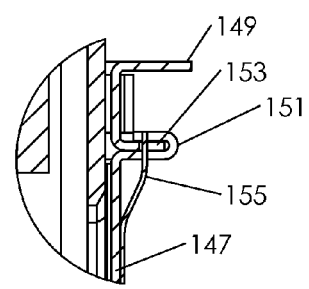
FIG. 22f shows a detail view taken from FIG. 22d.
Figure 23A:
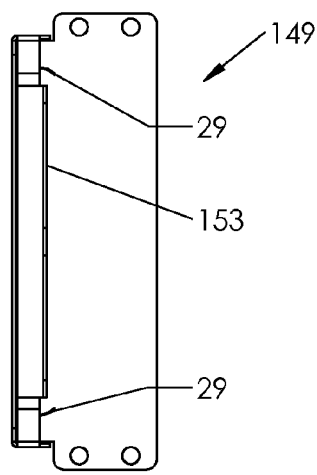
Figure 23B:
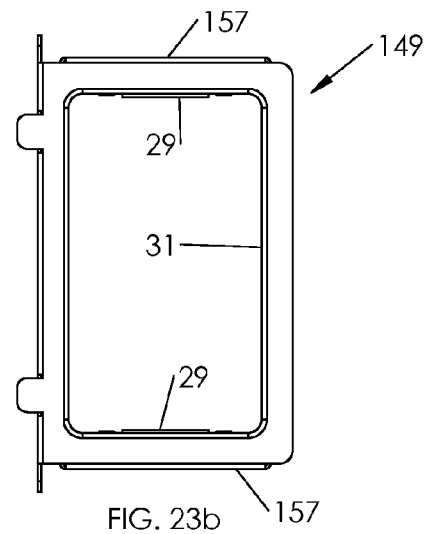
Figure 23C:
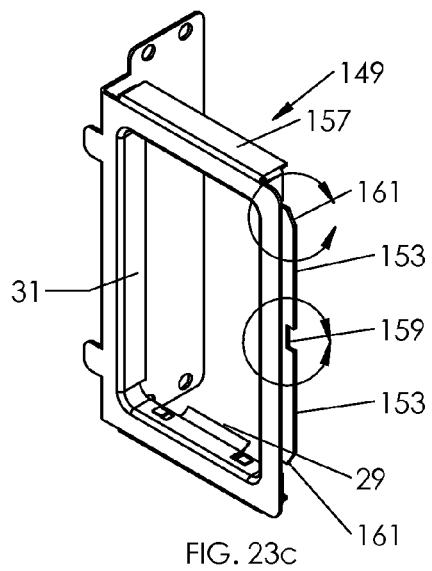
Figure 23D:
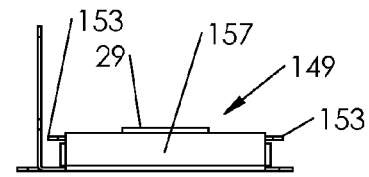
Figure 23E:
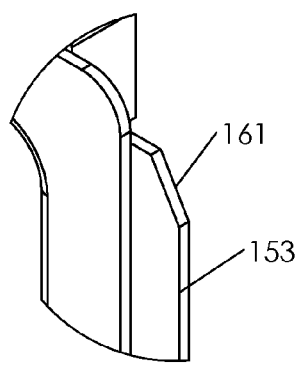
FIG. 23e is an upper detail view taken from FIG. 23c.
Figure 23F:
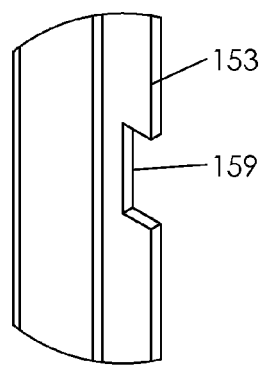
FIG. 23f is a lower detail view taken from FIG. 23c.
Figure 24A:
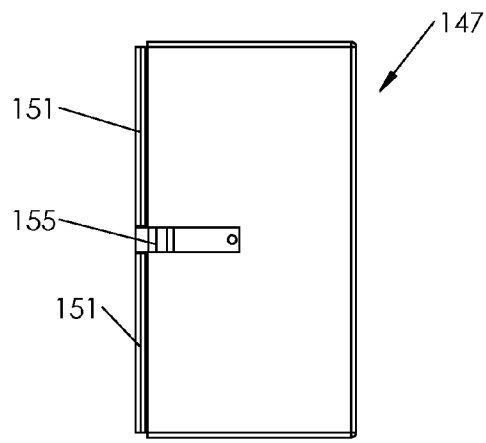
Figure 24B:
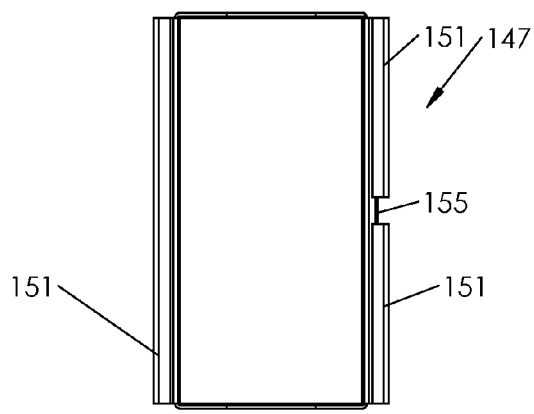
Figure 24C:
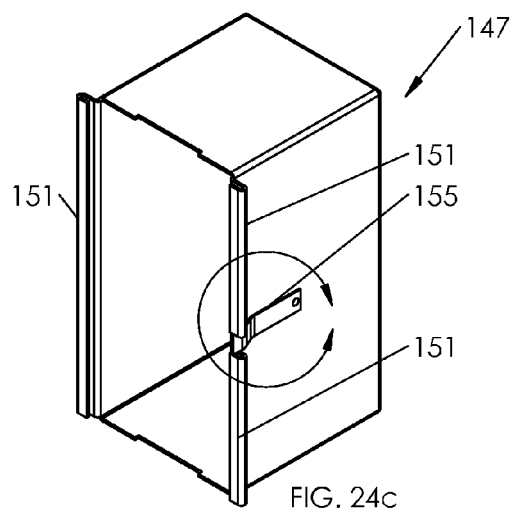
Figure 24D:
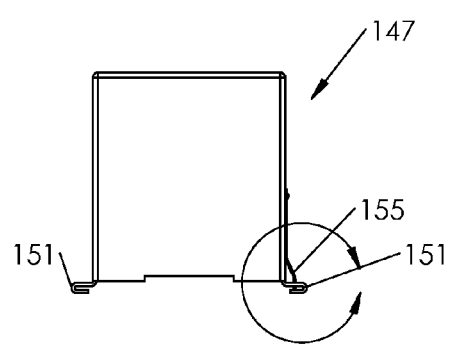
Figure 24E:
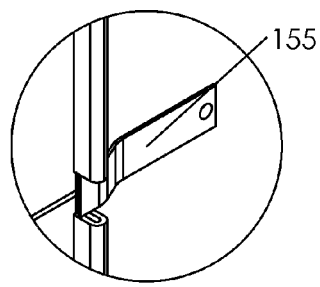
FIG. 24e is a detail view taken from FIG. 24c.
Figure 24F:
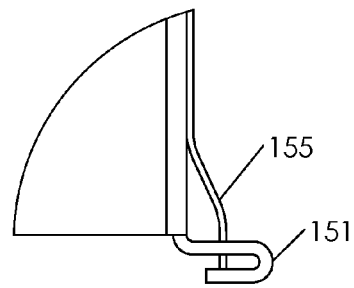
FIG. 24f is a detail view taken from FIG. 24d.

FIG. 20 and FIGS. 21*a-b* illustrate an alternative embodiment in which bracket 139 is mounted on stud 1 with fasteners 17. Drywall 5 is mounted in front of stud 1 and bracket 139. Inside perimeter wall 31 acts as a template for cutting hole 6 in drywall 5 using a rotating cutting tool with guide tip. Electrical box 141 may be pushed into hole 6 and bracket 139 after box 141 is wired (not shown). Teeth 27 of box 141 are retained by sprung retainers 29 on bracket 139 and hold box 141 in position. Pull 101 is pulled on as box 141 is pushed-in to avoid deflection of bracket 139 and ensure secure retainment of box 141 in bracket 139 on drywall 5. Recess 107 on box 141 allows access to pull 101. After use, pull 101 may be cut off or pushed back into bracket 139. Conventional electrical device 143 is installed through plates 52 with fasteners 85 into ratchet threads 59 of box 141. Conventional cover plate 145 is mounted on device 143 with screws 83 in the conventional manner. Alternatively, a snap-in device, as shown in FIG. 3 and FIG. 5, can be employed with a slide-in box configuration similar to box 141 but with the same matching retainment and alignment surfaces as sleeve 7 shown in FIGS. 1*a-e*. As an alternate embodiment, rather than inserting the slide in box, a sleeve can be used for a low voltage installation. A multigang version of this embodiment is envisioned.

FIGS. 22*a-f* illustrate a slide-on box 147 (shown in detail in FIGS. 24*a-f*) mounted on bracket 149 (shown in detail in FIGS. 23*a-f*). Bracket 149 is mounted to stud 1. Box 147 has hems 151 on either side that slide on rails 153 on either side of bracket 149. Box 147 can be installed from the top or bottom of bracket 149. Sprung arm 155, riveted to the side of box 147, engages recess 159 of bracket rail 153 on the non-stud side of bracket 149 preventing box 147 from moving after installation. Chamfer 161 at the end of rails 153 facilitate alignment of mating features and allows sprung arm 155 on box 147 to flex and run on rail 153 until it drops into recess 159. To remove box 147 from bracket 149, sprung arm 155 is disengaged from recess 155 and box 147 is slid up or down. Flanges 153 of bracket 149 align with the top and bottom of box 147 to completely enclose the line voltage installation. Bracket 149 can be mounted as shown or rotated 180 degrees for mounting on the other side of stud 1. Bracket 149 has interior perimeter wall 31 upon which the rotating drywall cutting tool guide runs. Sleeve 7, as shown in FIGS. 9*a-d*, is inserted into hole 6, bracket 149 and box 147. Snap-in electrical device 9 and snap-on cover plate 11 may be installed in sleeve 7 as shown in FIGS. 1*a-e*. Bracket 149 may be used without box 147 for low voltage installation. A pull on bracket 149 may be employed to ensure a solid installation. Box 147 and bracket 149 may be of any size to facilitate multiple wires and/or conduits and/or additional volume for larger devices.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. It should be understood that the term "drywall" as used throughout the disclosure is representative of any wall substrate. Similarly, it should be understood that the concepts disclosed herein are applicable to other electrical devices, such as keypads, speakers, display devices, and the like and to supporting other elements or appliance within a building surface.

What is claimed is:

1. An assembly comprising:
   a box structure formed as an enclosure for at least one electrical device, the box structure comprising:
   a first side mountable to a side of a building wall stud, and
   a front side including a cutout segment, the cutout segment having a periphery defining an opening in a wall substrate, wherein the front side is flush with an inner surface of the wall substrate, and the cutout segment area is less than the dimensional area of the front side;
   a removable sleeve engageable with the box structure and the wall substrate to secure tight contact between the wall substrate and the box structure irrespective of the thickness of the wall substrate; and
   at least one electrical device configured to be coupled with the sleeve for insertion in the box structure.

2. An assembly as recited in claim 1, wherein the front side comprises areas at opposite locations of the cutout segment.

3. An assembly as recited in claim 2, wherein the volume of the enclosure encompasses portions bounded by the cutout segment and the front side areas opposite the cutout segment.

4. An assembly as recited in claim 2, wherein the front side comprises an inner flange proximate the cutout segment periphery, the flange forming a template guide for cutting the wall substrate opening.

5. An assembly as recited in claim 2, further comprising retainers coupled respectively to the front side areas, wherein the retainers are configured to mate with a sleeve insertable in the box structure through the cutout segment.

6. An assembly as recited in claim 5, wherein each of the front side surface areas comprises a slot proximate the cutout periphery, each slot linked with a respective said retainer.

7. An assembly as recited in claim 6, further comprising a second side opposite the first side, the second side comprising a retractable pull mechanism.

8. An assembly as recited in claim 7, wherein the retractable pull mechanism comprises a slot formed in the second side and a pull member slidably engaged with the slot.

9. An assembly as recited in claim 2, further comprising a divider plate generally parallel to the first side, thereby forming a plurality of compartments for respectively enclosing a plurality of devices.

10. An assembly as recited in claim 9, wherein a first said compartment is configured to accommodate a line voltage electrical device and a second said compartment is configured to accommodate an electrical communication device.

11. An assembly as recited in claim 9, wherein each front side surface area comprises a slot in alignment with the divider plate for insertion and removal of the divider plate.

12. An assembly as recited in claim 9, wherein the divider plate comprises an offset portion.

13. An assembly as recited in claim 1, wherein the sleeve comprises:
   an outer longitudinal surface mountable to the box structure through the opening in the wall substrate;
   an inner longitudinal surface configured to hold the electrical device inserted therein; and
   a flange formed at an end of the sleeve, the flange configured to abut an outer surface of the wall substrate.

14. An assembly as recited in claim 13, wherein the box structure further comprises a retainer; and
   the sleeve further comprises teeth spaced along an extent of the outer surface, the teeth configured for mating with the retainer of the box structure.

15. An assembly as recited in claim 14, wherein the sleeve further comprises means for disengaging the box structure retainer from the teeth.

16. An assembly as recited in claim 15, wherein the sleeve further comprises at least one runner element formed along the outer surface, the runner element configured to stabilize the position of the sleeve within the box structure.

17. An assembly as recited in claim 14, wherein the sleeve further comprises a divider plate extending in the longitudinal direction to for abutment with the divider plate of the box structure.

18. An assembly as recited in claim 14, wherein the flange comprises indentations for engaging an electrical device coverplate.

19. An assembly as recited in claim 1, wherein the electrical device comprises:
   a housing; and
   an electrical component interior of the housing; and
   an apparatus configured for tightly engaging the housing with the sleeve.

20. An assembly as recited in claim 19, wherein the apparatus comprises a sprung latch element configured for attachment to the flange of the sleeve.

21. An assembly as recited in claim 20, wherein the latch comprises a first surface configured for flush contact with the member, and a sloped surface.

22. An assembly as recited in claim 21, wherein the apparatus further comprises a spring configured to bias the latch sloped surface against the sleeve flange upon engagement of the housing with the sleeve.

23. An assembly as recited in claim 22, wherein the apparatus further comprises means for retracting the latch from the sleeve for removal therefrom.

24. An assembly as recited in claim 19, wherein the housing further comprises a rib along an outer surface, the rib configured to stabilize the position of the housing within the sleeve.

25. An assembly as recited in claim 19, wherein the housing further comprises an electrical connector integral to the exterior of the housing for coupling wiring to the electrical component.

26. An assembly as recited in claim 25, wherein the connector is non-conductive.

27. An assembly as recited in claim 25, wherein the connector is configured for mating with a wiring connector interior of the wall.

28. An assembly as recited in claim 25, wherein the housing further comprises a plurality of electrical wiring contacts.

29. An assembly as recited in claim 25, wherein the housing further comprises a plurality of ports providing wiring access to the interior electrical component.

* * * * *